United States Patent
Xiong et al.

(10) Patent No.: US 12,119,158 B2
(45) Date of Patent: Oct. 15, 2024

(54) POWER CONVERSION MODULE AND MAGNETIC COMPONENT THEREOF

(71) Applicant: Delta Electronics, Inc., Taoyuan (TW)

(72) Inventors: Yahong Xiong, Taoyuan (TW); Junguo Cui, Taoyuan (TW); Kaijian Yang, Taoyuan (TW); Dongjie Gu, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 331 days.

(21) Appl. No.: 17/409,223

(22) Filed: Aug. 23, 2021

(65) Prior Publication Data
US 2022/0102054 A1    Mar. 31, 2022

(30) Foreign Application Priority Data
Sep. 25, 2020  (CN) .......................... 202011022986.4

(51) Int. Cl.
*H01F 27/26* (2006.01)
*H01F 27/30* (2006.01)

(52) U.S. Cl.
CPC ......... *H01F 27/263* (2013.01); *H01F 27/306* (2013.01)

(58) Field of Classification Search
CPC ................ H01F 27/263; H01F 27/306; H01F 2027/065; H01F 27/06; H01F 27/2852; H01F 27/266; H02M 3/003; H02M 3/1584

See application file for complete search history.

(56) References Cited

U.S. PATENT DOCUMENTS

| 9,263,177 B1 | 2/2016 | Ikriannikov et al. |
| 2008/0309442 A1 * | 12/2008 | Hebert .................. H01F 27/292 |
| | | 257/738 |
| 2009/0175014 A1 * | 7/2009 | Zeng ...................... H05K 1/145 |
| | | 361/782 |
| 2015/0062989 A1 * | 3/2015 | Su ........................ H05K 1/0373 |
| | | 361/748 |
| 2016/0086723 A1 | 3/2016 | Su et al. |

FOREIGN PATENT DOCUMENTS

| CN | 105185554 A | 12/2015 | |
| CN | 103081325 B | 8/2016 | |
| CN | 107046366 A | 8/2017 | |
| CN | 110217124 A * | 9/2019 | ............. B60L 53/22 |
| CN | 108022917 B | 11/2019 | |
| CN | 111106074 A | 5/2020 | |

\* cited by examiner

*Primary Examiner* — Tuyen T Nguyen
(74) *Attorney, Agent, or Firm* — KIRTON McCONKIE; Evan R. Witt

(57) ABSTRACT

The present disclosure provides a power conversion module including a magnetic component and a power device layer. The magnetic component includes a main body layer, a first magnetic core, a second magnetic core and a conductor. The main body layer includes a first surface and a second surface opposite to each other. The first magnetic core is embedded in the main body layer and adjacent to the first surface. The second magnetic core is embedded in the main body layer and adjacent to the second surface. The first magnetic core and the second magnetic core are connected to form plural magnetic columns. The conductor is embedded between the first surface and the second surface. The conductor is partially disposed between the plural magnetic columns. The power device layer is disposed on the first surface. The power device layer includes a power device electrically connected to conductor.

18 Claims, 34 Drawing Sheets

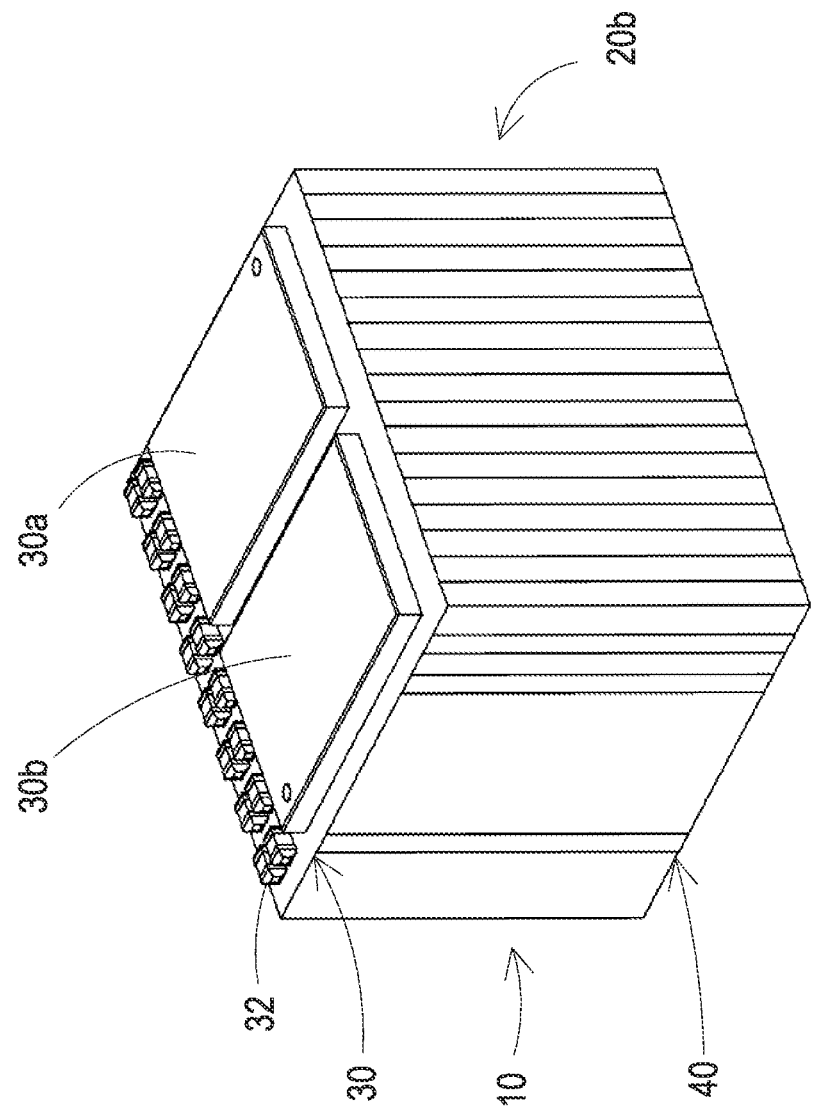

POWER CONVERSION MODULE AND MAGNETIC COMPONENT THEREOF

CROSS-REFERENCE TO RELATED APPLICATION

This application claims priority to China Patent Application No. 202011022986.4, filed on Sep. 25, 2020. The entire contents of the above-mentioned patent application are incorporated herein by reference for all purposes.

FIELD OF THE INVENTION

The present disclosure relates to a technology field of power electronic devices, and more particularly to a power conversion module and a magnetic component thereof.

BACKGROUND OF THE INVENTION

Power electronic device is an essential part of a device applied in the industries of electric power, electronics, electric motors and energy sources in recently years. Ensuring the long-term stable operation of the power electronic device and improving the power conversion efficiency of the power electronic device have always been an important purpose pursued by those skilled in the art.

With the rapid development of cloud computing and mobile communication, high-power DC/DC power conversion modules have also been widely used in communication products. On the other hand, with the trend of miniaturizing communication products, it is inevitable that the power module should increase the efficiency while reducing the volume to increase the power density. Therefore, how to design a reasonable structure and layout for a power conversion module to improve the conversion efficiency and reduce the volume of the power conversion module is one of the hot issues in this technical field.

However, in the power conversion module, a large part of the volume and the loss are caused by the inductor magnetic core. How to design the structure of the inductor magnetic core and the power conversion module is particularly critical. In a conventional power conversion module, a magnetic core is for example embedded between several layers of a multilayer printed circuit board, so as to reduce the size of the power conversion module. Soft-magnetic ferrite is chosen as material of a magnetic core and the core shape is mostly ring. However, since the saturation magnetization of the soft-magnetic ferrite is low, the saturation current of the magnetic component made of the soft-magnetic ferrite is low. Therefore, in order to improve the output current capability of the power conversion module, it is often necessary to select the iron powder with greater saturation magnetization as the core material. While the magnetic component is made of the iron powder core material, the ring design is still adopted. In that, the inner diameter and the outer diameter of the magnetic core are different sufficiently, and it results in uneven distribution of losses in the iron powder magnetic core, which fails to meet the practical requirements.

Therefore, there is a need of providing a power conversion module and a magnetic component thereof to overcome the above drawbacks encountered in the prior art, and achieve the purpose of optimizing the power conversion module. That is an extremely important subject for persons skilled in the art.

SUMMARY OF THE DISCLOSURE

An object of the present disclosure is to provide a power conversion module and a magnetic component thereof. By optimizing the arrangement of various components and disposing the power device on the top of the power conversion module, the top surface of the power device of the main heat source is located at the highest surface of the power conversion module, so as to facilitate the installation of heat sinks, and force the power conversion module to dissipate heat.

Another object of the present disclosure is to provide a power conversion module and a magnetic component thereof. By arranging a magnetic core set and a conductor in a main body layer to construct the magnetic component, the output end of the power device is electrically connected to the magnetic component directly, so that the parasitic impedance on the output current transmission path is reduced, and the power density of the power conversion module is improved effectively. Furthermore, when the magnetic core set of the magnetic component is disposed adjacent to the power device, the magnetic core set is embedded in the main body layer by using a vertical arrangement in the closed path of the magnetic field lines, so as to further reduce the parasitic parameters and increase the power density of the power conversion module. Moreover, the transmission of various signals is realized through the main body layer, so as to make the assembly and fixation simple and reliable. At the same time, the volume of the power conversion module is reduced, and the overall power density of the power conversion module is improved.

A further object of the present disclosure is to provide a power conversion module and a magnetic component thereof. By disposing the magnetic component in the main body layer, it facilitates the pins and the input capacitor of the power conversion module to be optimized according to the practical requirements. For example, the pins and the magnetic component are coplanar, or the input capacitor is disposed adjacent to the power device, so as to optimize the circuit and reduce the influence of parasitic parameters. Further, the purposes of reducing the volume of the power conversion module and increasing the overall power density of the power conversion module are achieved.

In accordance with an aspect of the present disclosure, a power conversion module is provided and includes a magnetic component and a power device layer. The magnetic component includes a main body layer, a first magnetic core, a second magnetic core and a conductor. The main body layer includes a first side and a second side. The first side and the second side are two opposite sides. The first magnetic core is embedded in the main body layer and disposed adjacent to the first side. The second magnetic core is embedded in the main body layer and disposed adjacent to the second side. The first magnetic core and the second magnetic core are disposed correspondingly and connected to each other to form a magnetic core set, which has a plurality of magnetic columns. The conductor is embedded between the first side and the second side, and includes at least one winding. At least one part of the at least one winding is disposed between the plurality of magnetic columns. The power device layer is disposed on the first side of the main body layer and includes at least one power device. The power device is electrically connected to the conductor.

In accordance with another aspect of the present disclosure, a magnetic component is provided and includes a main body layer, a first magnetic core, a second magnetic core and a conductor. The main body layer includes a first side, a second side, a first recess, a second recess and at least one hole. The first side and the second side are two opposite sides. The first recess is recessed inwardly from the first side, the second recess is recessed inwardly from the second side, and the first recess and the second recess are in communication with each other through the at least one hole. The first magnetic core is received in the first recess. The second magnetic core is received in the second recess, and spatially corresponds to the first magnetic core. The first magnetic core and the second magnetic core are connected to each other through the at least one hole to form a magnetic core set, which has a plurality of magnetic columns. The conductor is pre-embedded in the main body layer, and includes at least one winding, a first connection portion and a second connection portion. The first connection portion and the second connection portion are embedded in two opposite walls of the main body layer. The at least one winding is connected and stretched between the first connection portion and the second connection portion. One end surface of the first connection portion is at least partially exposed to the first side, and one end surface of the second connection portion is at least partially exposed to the second side. At least one part of the at least one winding is disposed between the plurality of magnetic columns.

The above contents of the present disclosure will become more readily apparent to those ordinarily skilled in the art after reviewing the following detailed description and accompanying drawings, in which:

BRIEF DESCRIPTION OF THE DRAWINGS

FIGS. 27A and 27B are perspective structural views illustrating a power conversion module according to an eighth embodiment of the present disclosure.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
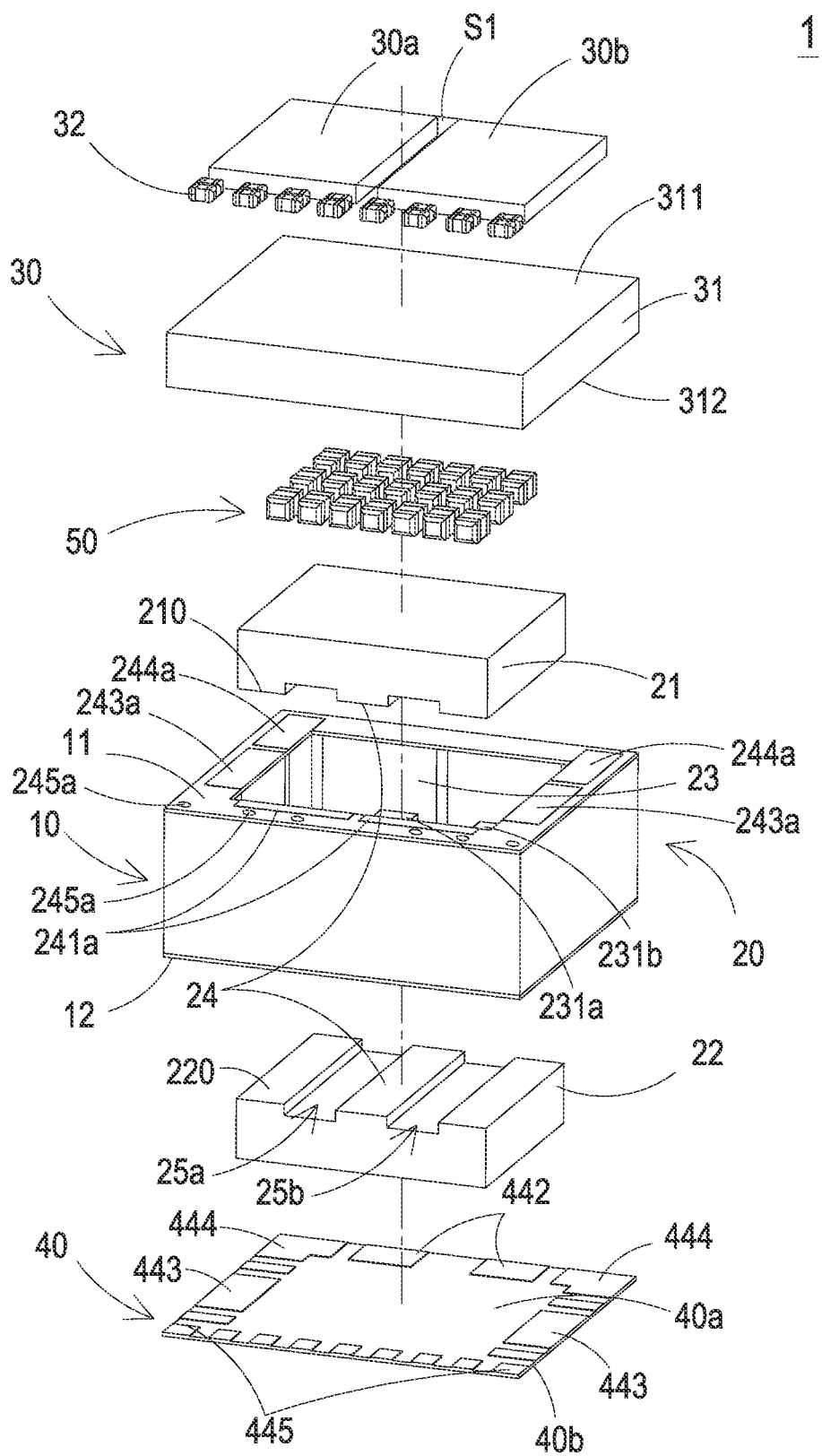
FIG. 1 is an exploded view illustrating a power conversion module according to a first embodiment of the present disclosure.
Figure 2A:
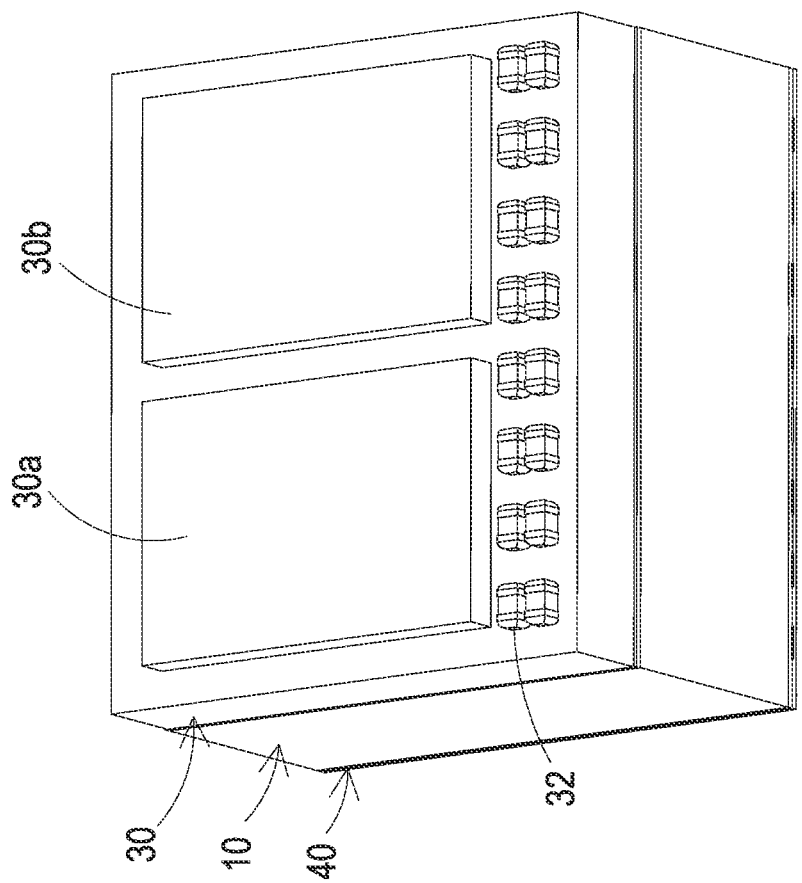
FIG. 2A is a perspective structural view illustrating the power conversion module according to the first embodiment of the present disclosure.
Figure 2B:
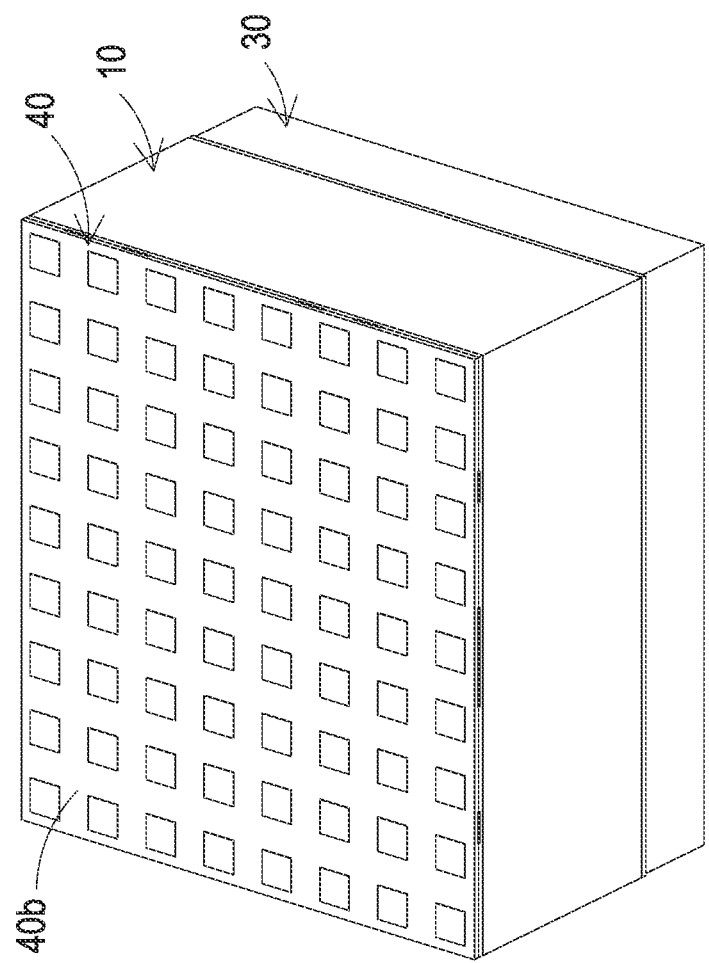
FIG. 2B is a perspective structural view illustrating the power conversion module according to the first embodiment of the present disclosure and taken from another perspective.
Figure 3:
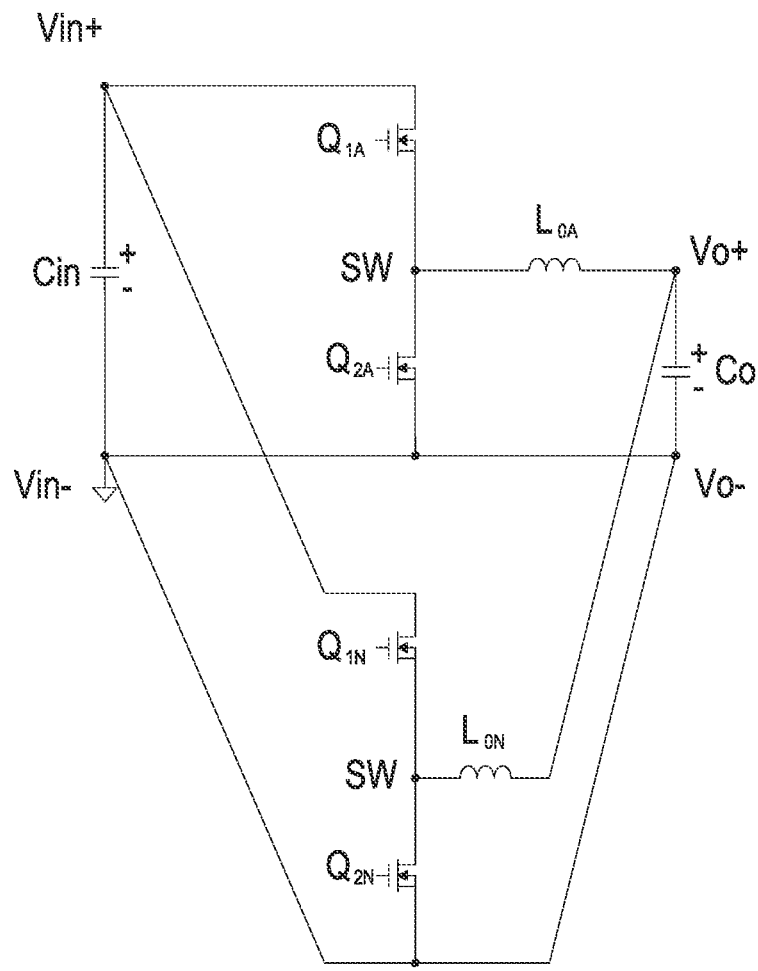
FIG. 3 shows the circuit topology corresponding to the power conversion module of the present disclosure.

FIG. 1 is an exploded view illustrating a power conversion module according to a first embodiment of the present disclosure. FIGS. 2A and 2B are perspective structural views illustrating the power conversion module according to the first embodiment of the present disclosure. FIG. 3 shows the circuit topology corresponding to the power conversion module of the present disclosure. In the embodiment, the power conversion module 1 includes a magnetic component 20, a power device layer 30 and a pin layer 40. The magnetic component 20 includes a main body layer 10, a first magnetic core 21, a second magnetic core 22 and a conductor 23. The main body layer 10 includes a first side 11 and a second side 12. Preferably but not exclusively, in the embodiment, the main body layer 10 is a board, and the first side 11 and the second side 12 are two opposite sides. Preferably but not exclusively, the first magnetic core 21 and the second magnetic core 22 are made of an iron powder core material or a ferrite material. In the embodiment, the first magnetic core 21 is embedded in the main body layer 10 and disposed adjacent to the first side 11. The second magnetic core 22 is embedded in the main body layer 10 and disposed adjacent to the second side 12 and spatially corresponds to the first magnetic core 21. Preferably but not exclusively, in the embodiment, the first magnetic core 21 and the second magnetic core 22 are E-shaped magnetic cores, and connected to each other through a first connection surface 210 of the first magnetic core 21 and a second connection surface 220 of the second magnetic core 22 to form a magnetic core set, which has a plurality of magnetic columns 24. The conductor 23 is embedded between the first side 11 and the second side 12 of the main body layer 10. Preferably but not exclusively, at least one part of the conductor 23 is disposed around the lateral walls of the first magnetic core 21 and the second magnetic core 22. In addition, the conductor 23 further includes at least one winding 231a, 231b. At least one part of the at least one winding 231a, 231b is penetratingly disposed between the plurality of magnetic columns 24. Preferably but not exclusively, the at least one winding 231a, 231b is magnetically coupled with the magnetic core set formed by the first magnetic core 21 and the second magnetic core 22 to form an inductor or a transformer. In the embodiment, the first magnetic core 21 and the second magnetic core 22 spatially correspond to each other and are assembled to form a firm structural support. Moreover, in the embodiment, the power device layer 30 and the pin layer 40 spatially correspond to each other. Preferably but not exclusively, in an embodiment, the power device layer 30, the pin layer 40 and the main body layer 10 are combined to form a board. Preferably but not exclusively, in an embodiment, the power device layer 30, the pin layer 40 and the main body layer 10 are three boards. In some embodiments, the power device layer 30 and the main body layer 10 are combined to form a board, or the main body layer 10 and the pin layer 40 are combined to form a board. In other embodiments, the power device layer 30, the main body layer 10 and the pin layer 40 are combined to form a board. The present disclosure is not limited thereto. In the embodiment, the power device layer 30 is disposed on the first side 11 of the main body layer 10, and the pin layer 40 is disposed on the second side 12 of the main body 10.

Preferably but not exclusively, in the embodiment, the power device layer 30 is a board attached to the first side 11, and includes power devices 30a, 30b, a control component 32 and a first circuit board 31. The first circuit board 31 includes a first surface 311 and a second surface 312 opposite to each other. In the embodiment, the second surface 312 of the first circuit board 31 faces the first side 11 of the main body layer 10. The power devices 30a, 30b and the control component 32 are disposed on the first surface 311 of the first circuit board 31. Preferably but not exclusively, in the embodiment, each of the power devices 30a, 30b is a half bridge arm. In another embodiment, a half bridge arm is formed by a plurality of power devices 30a, 30b in parallel, and the half bridge arm and the input capacitor Cin (referring to FIG. 3) are connected in parallel. In the embodiment, top surfaces of the power devices 30a, 30b are configured to form a coplanar plane, which is located on the outermost top surface of power conversion module 1. It is advantageous for the heat dissipation device (not shown) to be attached and installed on the top surface of the power devices 30a, 30b of the power conversion module 1. In that, the heat dissipation efficiency of the power devices 30a, 30b is enhanced effectively. In other embodiment, the at least one of power devices 30a, 30b is disposed on the second surface 312 or embedded between the first surface 311 and the second surface 312. Certainly, the present disclosure is not limited thereto.

Figure 5:
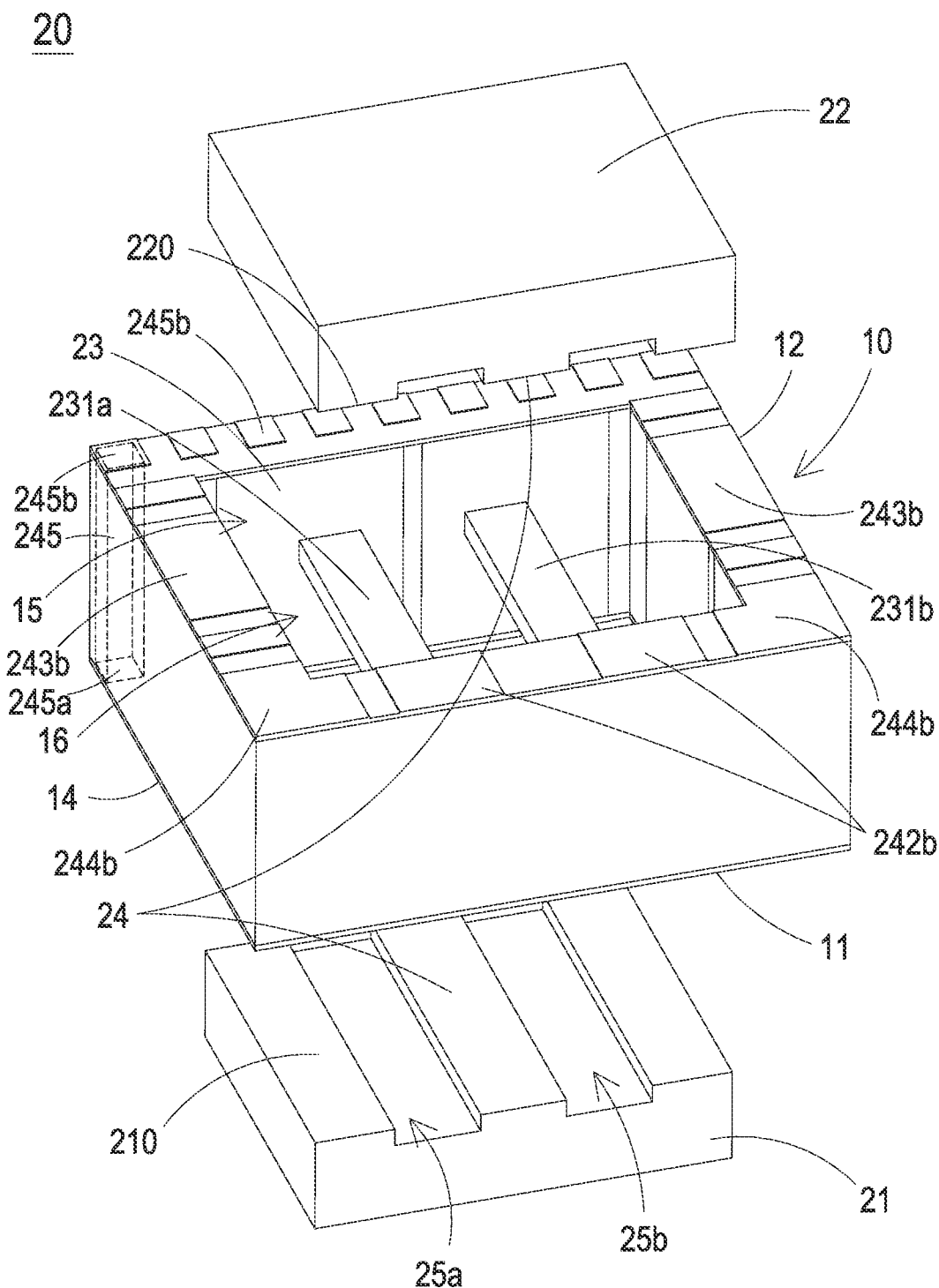
FIG. 5 is an exploded view illustrating the magnetic component according to a first embodiment of the present disclosure.

FIG. 5 is an exploded view illustrating the magnetic component according to a first embodiment of the present disclosure. Please refer to FIG. 1 and FIG. 5. In the embodiment, the magnetic component 20 further includes a power device connection surface 241a, a positive input connection surface 243a, a negative input connection surface 244a and a signal control connection surface 245a on the first side 11, and correspondingly connected to a positive output connection surface 242b, a positive input connection surface 243b, a negative input connection surface 244b and a signal control connection surface 245b on the second surface 312 of the first circuit board 31 of the power device layer 30. In that, the power device layer 30 is electrically connected to the pin layer 40 through the magnetic component 20. Referring to the circuit topology of FIG. 3, the power device connection surface 241a represents the power device pins SW which connected to the first power device 30a and the second power device 30b. The positive input connection surfaces 243a, 243b represent the connection of the positive input terminal Vin+. The negative input connection surfaces 244a and 244b represent the connection of the negative input terminal Vin−. The signal control connection surfaces 245a, 245b represent the connection of multiple control signals or sampling signals to the corresponding pins of the power device. In an embodiment, the power device layer 30 and the pin layer 40 are electrically connected through the conductor 23 of the magnetic component 20 or other via structures (not shown), which is described in detail later.

In the embodiment, the pin layer 40 is disposed adjacent to the second side 12 of the main body layer 10, and attached to a bottom surface of the second magnetic core 22. The pin layer 40 includes a first surface 40a and a second surface 40b opposite to each other. A positive output pin 442, a positive input pin 443, a negative input pin 444 and a signal control pin 445 are disposed on the first surface 40a. In the embodiment, the positive input pin 443 corresponds to the positive input terminal Vin+ in FIG. 3, the negative input pin 444 corresponds to the negative input terminal Vin−, and the positive output pin 442 corresponds to the positive output terminal Vo+, which provide external input and output electrical connections for the power conversion module 1. The signal control pin 445 is used to transmit control signals and sampling signals. In the embodiment, the positive output pin 442, the positive input pin 443, the negative input pin 444 and the signal control pin 445 are disposed on the first surface 40a and face the magnetic component 20 on the second side 12. Preferably but not exclusively, the positive output pin 442, the positive input pin 443, the negative input pin 444 and the signal control pin 445 are electrically connected to external pins disposed on the second surface 40b through a wiring in the pin layer 40. Preferably but not exclusively, the external pins are implemented by BGA, LGA or pads. The electrical connection between the power conversion module 1 and a system board (not shown) comprising an output capacitor Co is realized through the external pins. Moreover, the layout and size of the corresponding external pins on the second surface 40b are not limited, and designed according to the practical requirements of the system board. In another embodiment, the pin layer 40 of the power conversion module 1 is omitted. The positive output pin 442, the positive input pin 443, the negative input pin 444 and the signal control pin 445 are electrically connected to the system board through the positive output connection surface 242b, the positive input connection surface 243b, the negative input connection surface 244b and the signal control connection surface 245b directly. Similarly, the electrical connections for external input and output and transmitting the control signals and sampling signals are achieved in the power conversion module 1. Moreover, the thickness of the power conversion module 1 is reduced. Preferably but not exclusively, in other embodiments, the pin layer 40 is formed on an independent PCB board, so as to increase the sizes of the positive output pin 442, the positive input pin 443, the negative input pin 444, the signal control pin 445 and the corresponding external pins. Certainly, the present disclosure is not limited thereto.

In the embodiment, the power conversion module 1 further comprises an input capacitor layer 50 connected across the input end of the power conversion module 1. Preferably but not exclusively, the input capacitor layer 50 is arranged close to the power devices 30a and 30b. Preferably but not exclusively, in the embodiment, the input capacitor layer 50 is disposed on the second surface 312 of the first circuit board 31, or disposed between the power device layer 30 and the main body layer 10. Preferably but not exclusively, the first circuit board 31 includes an accommodation recess 13 arranged between the first circuit board 31 and the main body layer 10. The accommodation recess 13 is recessed inwardly from the second surface 312, and the input capacitor layer 50 is at least partially accommodated in the accommodation recess 13. In an embodiment, the input capacitor layer 50 and the power device layer 30 are located at the same layer, so that the power devices 30a, 30b are close to the input capacitor. Preferably but not exclusively, in other embodiments, corresponding to the positions of the power devices 30a, 30b, the input capacitor layer 50 is disposed on the first surface 311 or the second surface 312 of the first circuit board 31, or embedded between the first surface 311 and the second surface 312. The present disclosure is not limited thereto. Notably, in operation of the power devices 30a, 30b, a high-frequency parasitic oscillation is generated due to the parasitic parameters between the input capacitance Cin of the input capacitor layer 50 and the power devices 30a, 30b and the power device equivalent parameters, so that the loss of the power devices 30a, 30b in the operation are influenced. Therefore, by disposing the input capacitor layer 50 close to the power devices 30a, 30b as the design of the present disclosure, it helps to reduce the influence of parasitic parameters, and further achieves the purpose of reducing the volume of the power conversion module 1 and increasing the overall power density of the power conversion module 1.

Figure 4A:
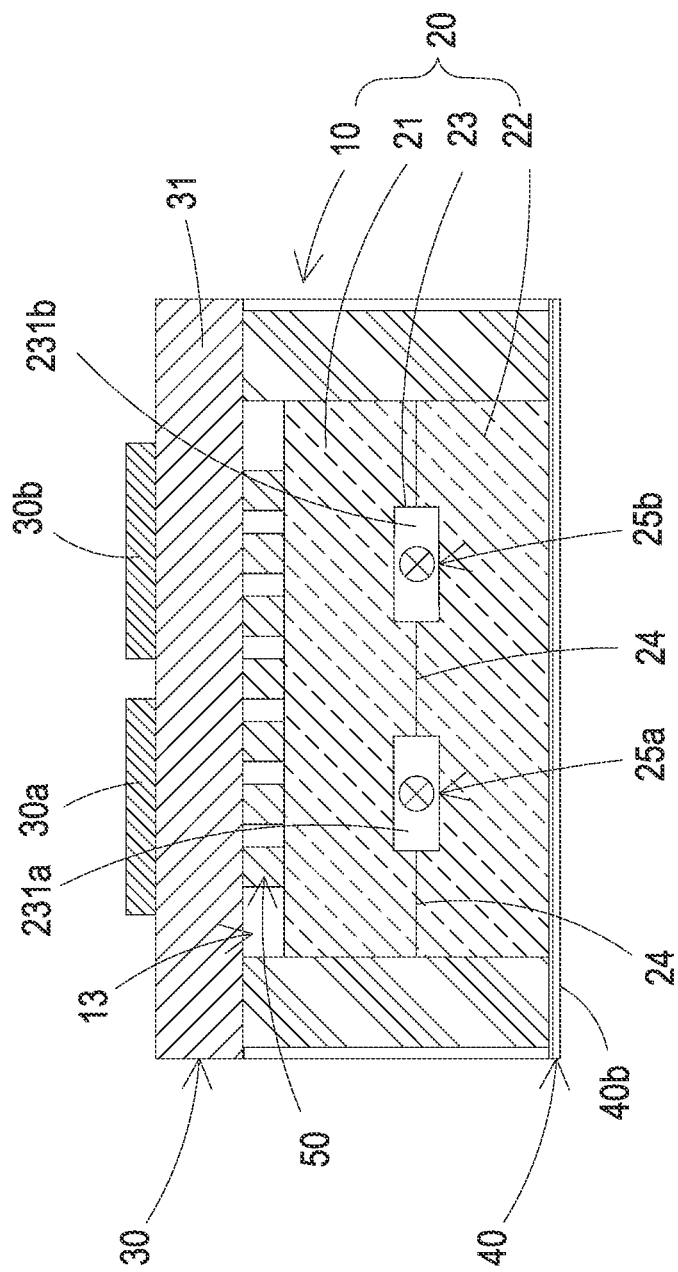
FIG. 4A shows an example of the current direction of the winding of the power conversion module according to the first embodiment of the present disclosure.
Figure 4B:
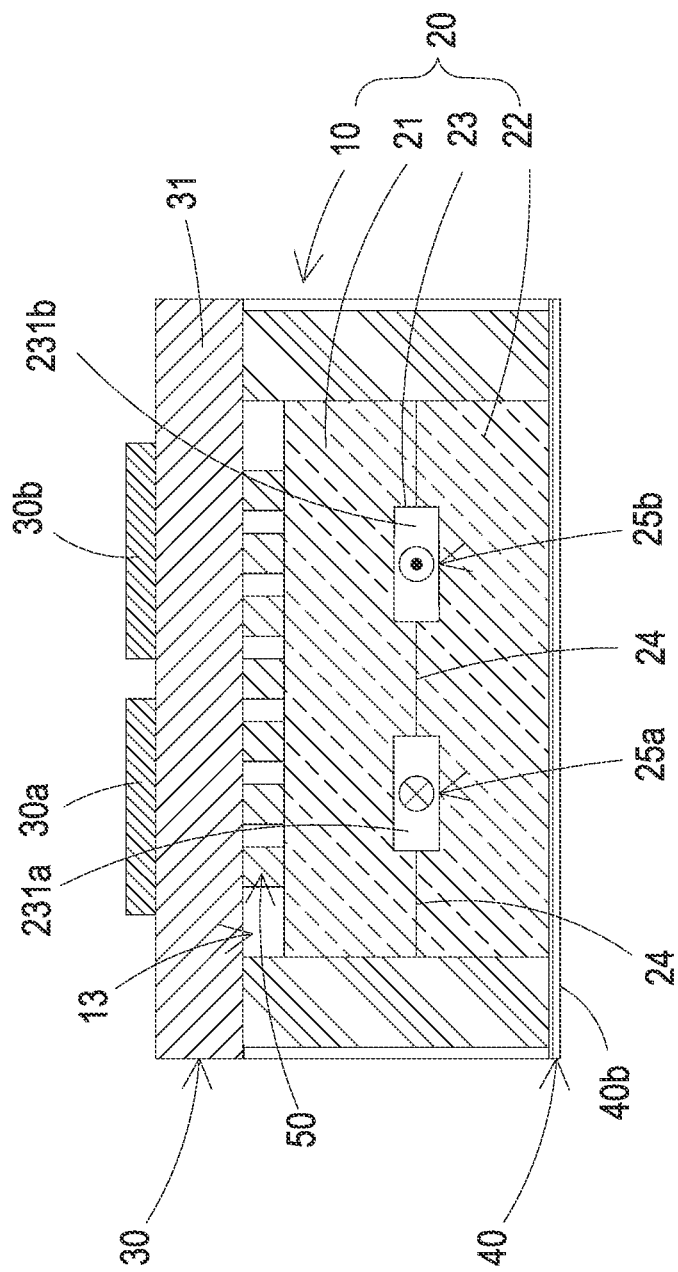
FIG. 4B shows another example of the current direction of the winding of the power conversion module according to the first embodiment of the present disclosure.

FIG. 4A shows an example of the current direction of the winding of the power conversion module according to the first embodiment of the present disclosure. FIG. 4B shows another example of the current direction of the winding of the power conversion module according to the first embodiment of the present disclosure. In the embodiment, the first magnetic core 21 and the second magnetic core 22 are E-shaped magnetic cores, and assembled to form a magnetic core set having three magnetic columns 24. The magnetic core set formed by the first magnetic core 21 and the second magnetic core 22 includes two windows 25a, 25b spatially corresponding to the two power devices 30a, 30b, respectively. In that, the window 25a is disposed adjacent to the power device 30a, and the window 25b is disposed adjacent to the power device 30b. The windings 231a, 231b pass through the two windows 25a, 25b, respectively. Notably, in an example, the current directions of the windings 231a, 231b in the two windows 25a, 25b are the same, as shown in FIG. 4A. In another example, the current directions of the windings 231a, 231b in the two windows 25a, 25b are opposite, as shown in FIG. 4B. The DC magnetic flux is superimposed and the AC magnetic flux is subtracted. The advantage is that the current ripple is greatly suppressed and the equivalent inductance is greatly increased.

In the embodiment, due to the height limitation of the power conversion module 1, the first magnetic core 21 and the second magnetic core 22 are for example E-shaped magnetic cores, and the magnetic-column thickness in the connecting direction of the magnetic-column center is relatively thin. Therefore, in a closed path of the magnetic field lines, the difference between the inner diameter and outer diameter of the E-shaped magnetic cores is effectively reduced. Even if the first magnetic core 21 and the second magnetic core 22 are made of an iron powder material with low magnetic permeability and high magnetic resistance, a uniform magnetic field line distribution and an advantage of low magnetic-core loss are achieved. In addition, the windings 231a, 231b passing through the windows 25a, 25b of the E-shaped magnetic core set are arranged horizontally. The E-shaped magnetic core set is combined with the horizontal windings. Comparing to the ring-shaped magnetic core set with the vertical windings, the ring cross-sectional area of the ring-shaped magnetic core set is enlarged when its size is changed and extended horizontally. In that, an uneven distribution of the magnetic field lines is caused in the inner diameter and the outer diameter. It fails to achieve the purposes of increasing the ring cross-sectional area and reducing the magnetic-core loss at the same time. However, when the E-shaped magnetic cores are extended horizontally along the direction perpendicular to the central connection line of the magnetic column, the thickness of the magnetic column in the central connection direction of the magnetic column is not increased, so that the purpose of reducing the magnetic-core loss by increasing the cross-sectional area is achieved. Therefore, when the first magnetic core 21 and the second magnetic core 22 are used to increase the cross-sectional area of the magnetic column or the magnetic substrate, the effect of reducing the magnetic-core loss is achieved.

Figure 6:
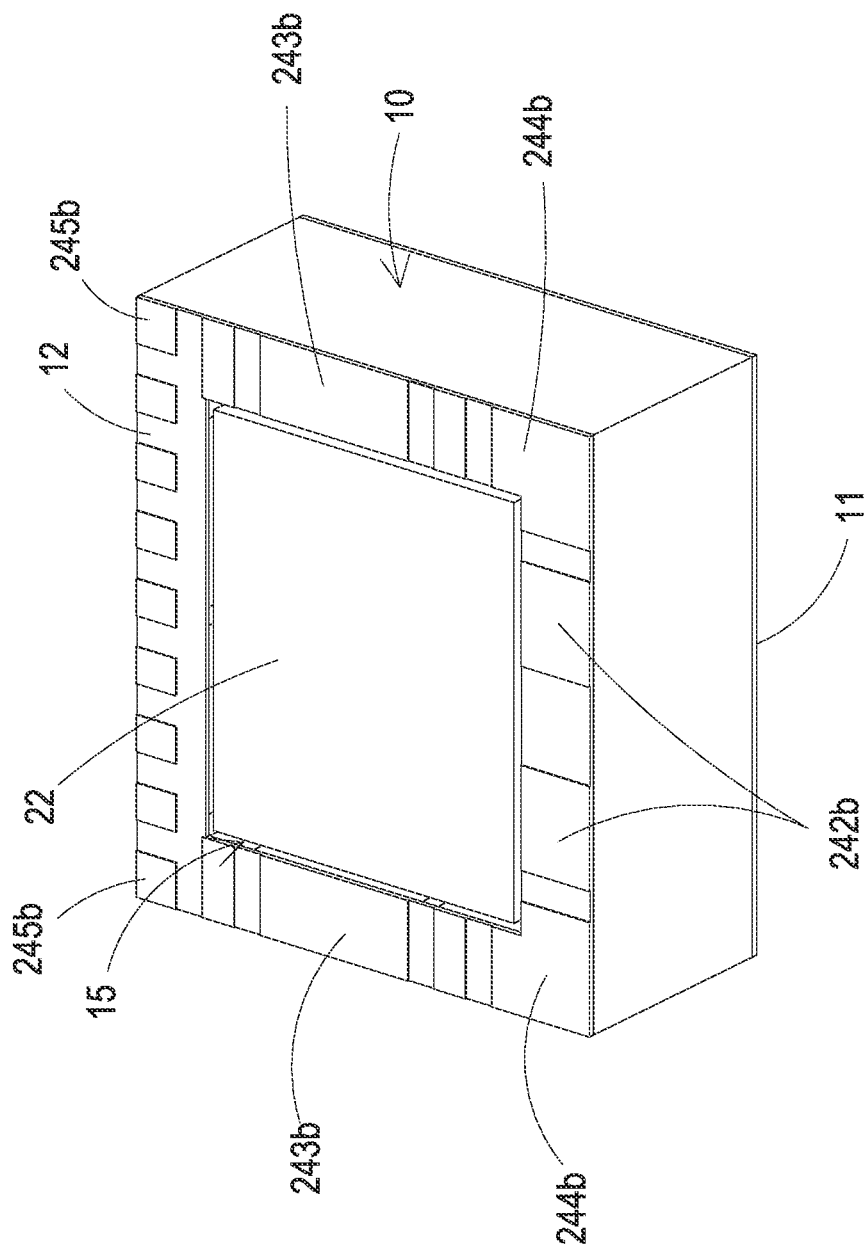
FIG. 6 is a perspective structural view illustrating the magnetic component according to the first embodiment of the present disclosure.
Figure 7:
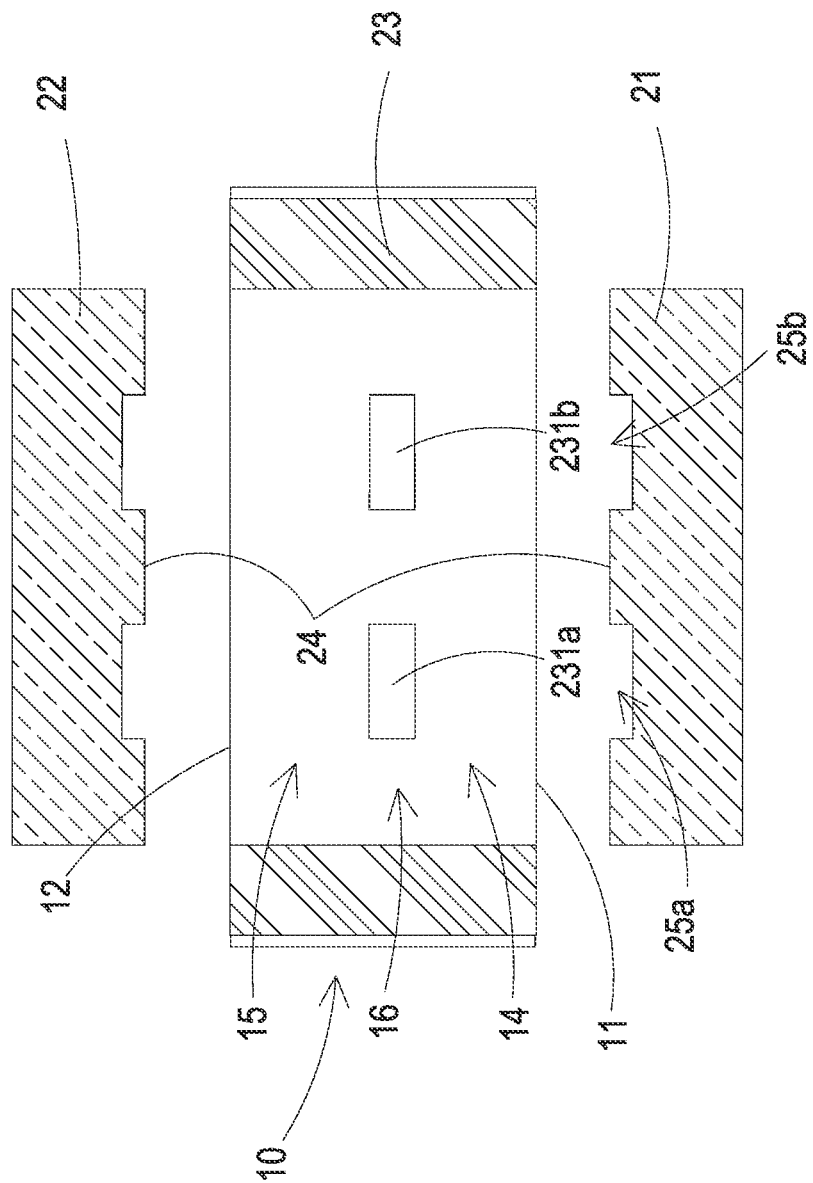
FIG. 7 is a cross-sectional view of FIG. 5.
Figure 8A:
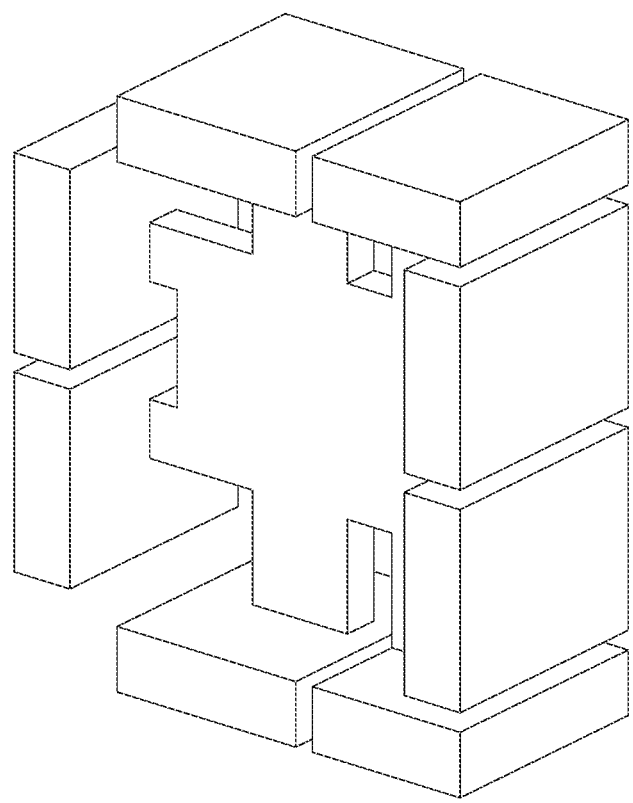
FIG. 8A shows an exemplary prefabricated structure of the conductor of the present disclosure.
Figure 8B:
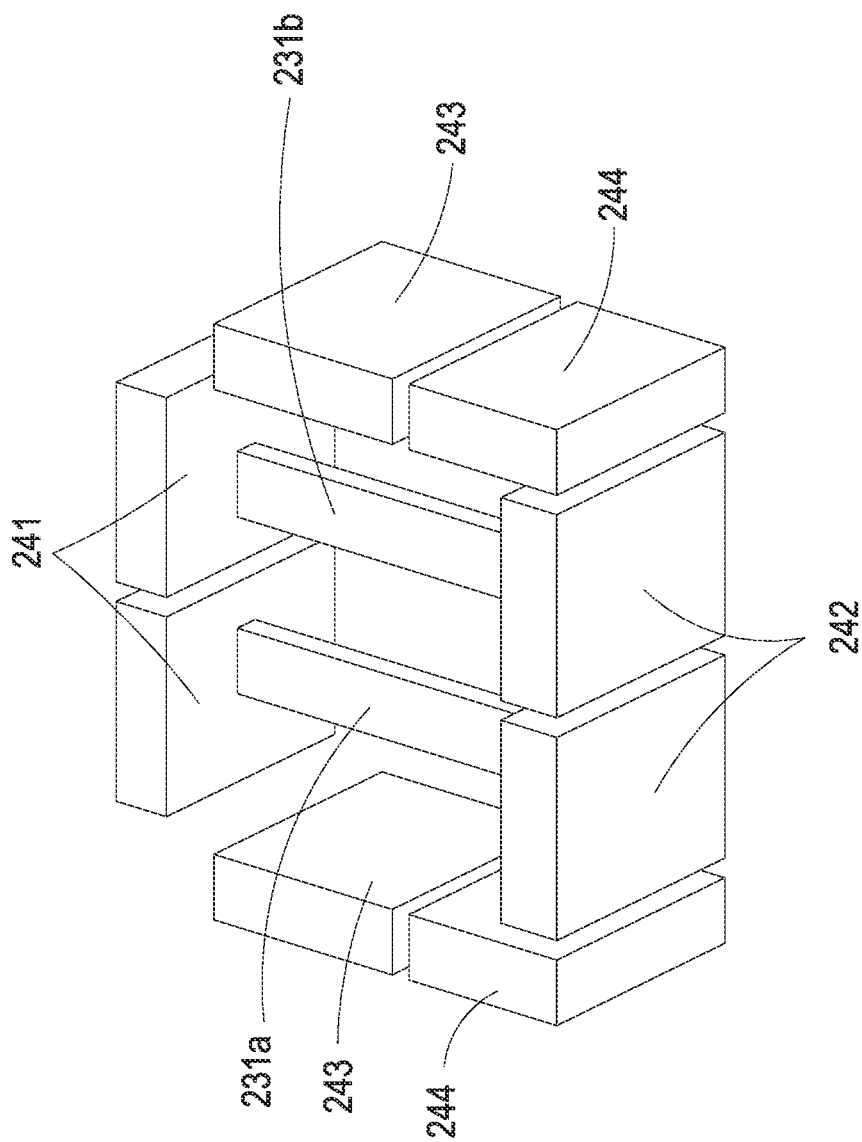
FIG. 8B shows an exemplary structure of the conductor of the present disclosure.

On the other hand, in the aforementioned power conversion module 1, the present disclosure further provides a structure of the magnetic component 20, as shown in FIG. 5 to FIGS. 8A and 8B. FIG. 5 is an exploded view illustrating the magnetic component according to a first embodiment of the present disclosure. FIG. 6 is a perspective structural view illustrating the magnetic component according to the first embodiment of the present disclosure. FIG. 7 is a cross-sectional view of FIG. 5. FIG. 8A shows an exemplary prefabricated structure of the conductor of the present disclosure. FIG. 8B shows an exemplary structure of the conductor of the present disclosure. Please refer to FIG. 1, FIG. 5 to FIG. 7, FIG. 8A and FIG. 8B. In the embodiment, the magnetic component 20 is provided and includes a main body layer 10, a first magnetic core 21, a second magnetic core 22 and a conductor 23. The main body layer 10 includes a first side 11, a second side 12, a first recess 14, a second recess 15 and at least one hole 16. The first side 11 and the second side 12 are two opposite sides. The first recess 14 is recessed inwardly from the first side 11, the second recess 15 is recessed inwardly from the second side 12, and the first recess 14 and the second recess 15 are connected to each other through the at least one hole 16. The first magnetic core 21 is received in the first recess 14. The second magnetic core 22 is received in the second recess 15, and spatially corresponds to the first magnetic core 21. The first connection surface 210 of the first magnetic core 21 and the second connection surface 220 of the second magnetic core 22 are connected to each other through the at least one hole 16 to form a magnetic core set, which includes at least one magnetic column 24 passing through the at least one hole 16. Preferably but not exclusively, in the embodiment, the conductor 23 is formed by at least one copper layer or at least one copper block, and is pre-embedded in the main body layer 10. In the embodiment, a prefabricated structure 23a made of for example a copper block is embedded in a circuit board structure, and then the prefabricated structure 23a shown in FIG. 8A is milled into the conductor 23 shown in FIG. 8B through a process such as control-deep milling. In the embodiment, the conductor 23 is pre-embedded in the main body layer 10, and includes at least one winding 231a, 231b, a first connection portion 241, a second connection portion 242, a third connection portion 243 and a fourth connection portion 244, embedded in the walls of the main body layer 10 and located between the first side 11 and the second side 12. In the embodiment, the first connection portion 241 and the second connection portion 242 are embedded in two opposite walls of the main body layer 10. The at least one winding 231a, 231b is connected and stretched between the first connection portion 241 and the second connection portion 242. The third connection portion 243 and the fourth connection portion 244 are embedded in the walls adjacent to the second connection portion 242. Moreover, the fourth connection portion 244 is disposed between the second connection portion 242 and the third connection portion 243. In another embodiment, the third connection portion 243 is disposed between the second connection portion 242 and the fourth connection portion 244. In the embodiment, the first end surface of the first connection portion 241 is at least partially exposed to the first side 11, and the power device connection surface 241a of the power conversion module 1 is formed, so as to achieve the connection of the power device pins SW shown in FIG. 3. The second end surface of the first connection portion 241 is selectively exposed to the second side 12. It is not limited herein. The second end surface of the second connection portion 242 is at least partially exposed to the second side 12, and the positive output connection surface 242b of the power conversion module 1 is formed and connected to the positive output pin 442 of the pin layer 40, so as to achieve the connection of the positive output terminal Vo+ shown in FIG. 3. The first end surface of the second connection portion 242 is selectively exposed to the first side 11. It is not limited herein. The first end surface of the third connection portion 243 is at least partially exposed to the first side 11, and the positive input connection surface 243a of the power conversion module 1 is formed. Moreover, the second end surface of the third connection portion 243 is at least partially exposed to the second side 12, and the positive input connection surface 243b is formed and electrically connected to the positive input pin 443 of the pin layer 40, so as to achieve the connection of the positive input terminal Vin+ shown in FIG. 3. In addition, the first end surface of the fourth connection portion 244 is at least partially exposed to the first side 11, and the negative input connection surface 244a of the power conversion module 1. The second end surface of the fourth connection portion 244 is at least partially exposed to the second side 12, and the negative input connection surface 244b is formed and electrically connected to the negative input pin 444 of the pin layer 40, so as to achieve the connection of the negative input terminal Vin− shown in FIG. 3.

Furthermore, in the embodiment, the magnetic component 20 further includes a fifth connection portion 245. Preferably but not exclusively, the fifth connection portion 245 is a copper block pre-embedded in the main body layer 10, or the vias formed in the board. As shown in FIG. 1, the fifth connection portion 245 is disposed in a lateral side of the main body layer 10 where the first connection portion 241 is located. By forming a plurality of vias disposed in the main body layer 10, one end of the fifth connection portion 245 is at least partially exposed to the first side 11, so as to form the signal control connection surface 245a of the power conversion module 1. Moreover, the second end of the fifth connection portion 245 is at least partially exposed to the second side 12, and the signal control connection surface 245b of the power conversion module 1 is formed and connected to the signal control pin 445 of the pin layer 40, so as to achieve the signal connection between the power device layer 30 and the pin layer 40 of the power conversion module 1, or the electrical connection of control signals or sampling signals between the at least one power device of the power conversion module 1 and the system board. In another embodiment, the fifth connection portion 245 is disposed on a lateral side of the main body layer 10 where the second connection portion 242 is located. It is adjustable according to the practical requirements.

In the embodiment, the fourth connection portion 244 is served as the connection of the negative input terminal Vin−, which is the ground terminal GND of the power conversion module 1. Moreover, the fourth connection portion 244 is a vertical copper block structure and served as the GND conductor connected upwardly to the GND network of the power device layer 30 and connected downwardly to the GND pin of the pin layer 40. Since the power device layer 30, the input capacitor layer 50 and the pin layer 40 of the present disclosure are separated by the E-type output inductance of the magnetic component 20, it results a longer distance between the input capacitor layer 50 and the pin layer 40, and a larger parasitic inductance of the loop. With the design of the GND conductor, it is helpful to reduce the parasitic inductance between the input capacitor layer 50 and the pin layer 40, thereby greatly reducing the risk of resonance between the parasitic inductance and the capacitance of the input capacitor layer 50.

In the embodiment, the main body layer 10 and the conductor 23 of the magnetic component 20 are combined into an integrated structure through a molding process. Preferably but not exclusively, the main body layer 10 is made of epoxy resin molding compound or a printed circuit board material. The present disclosure is not limited thereto.

Figure 8C:
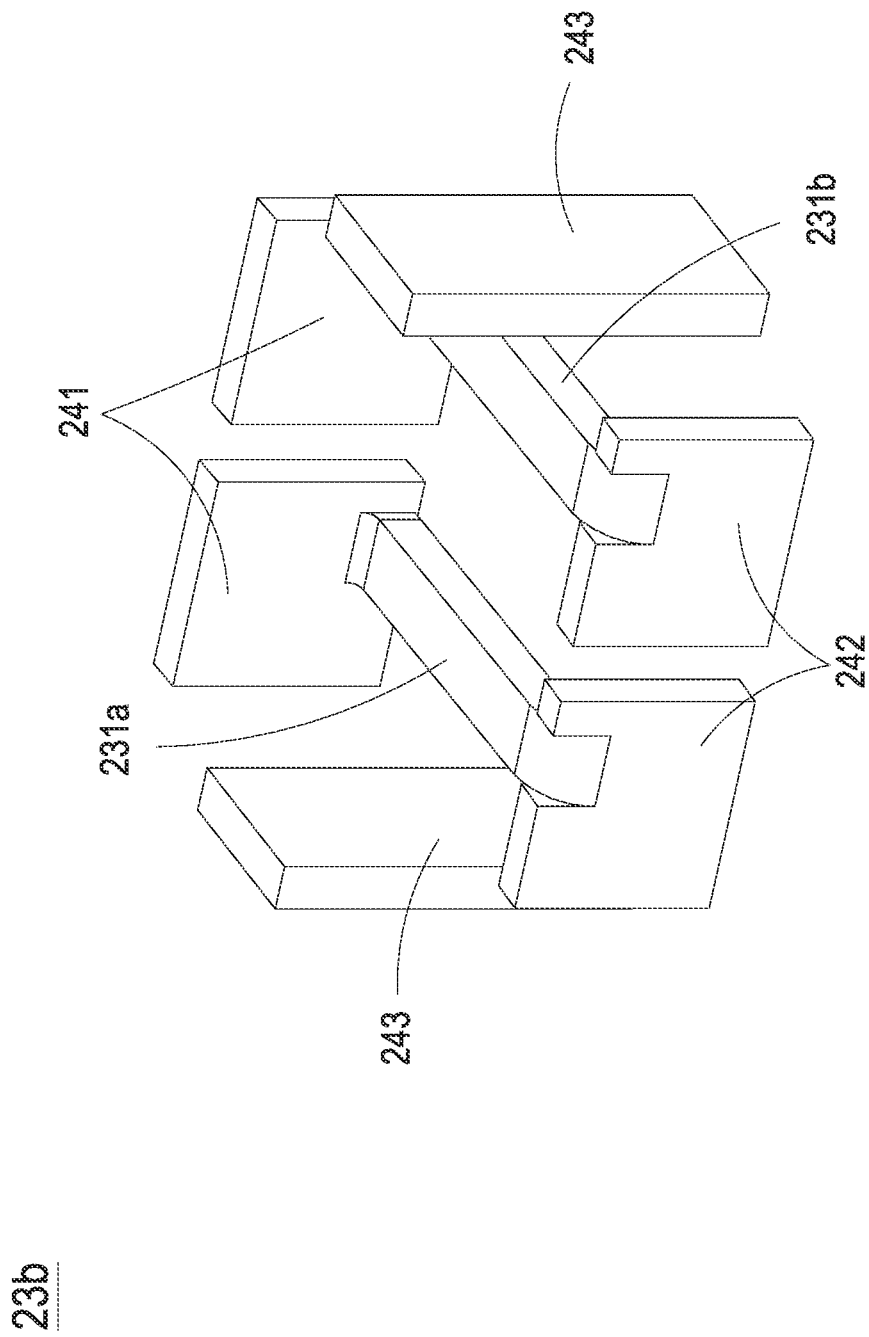
FIG. 8C shows another exemplary structure of the conductor of the present disclosure.

FIG. 8C shows another exemplary structure of the conductor of the present disclosure. In the embodiment, the structures, elements and functions of the conductor 23b are similar to those of the conductor 23 in FIG. 8B, and are not redundantly described herein. Please refer to FIG. 1, FIG. 5 to FIG. 7 and FIG. 8C. In the embodiment, the conductor 23b includes at least one winding 231a, 231b, a first connection portion 241, a second connection portions 242 and a third connection portion 243. The at least one winding 231a, 231b is connected and stretched between the first connection portion 241 and the second connection portion 242, so that a bent structure is collaboratively formed by the at least on winding 231a, 231b, the first connection portion 241 and the second connection portion 242. Preferably but not exclusively, a horizontal copper block part is served as the at least one winding 231a, 231b passing through the window 25a, 25b formed by the first magnetic core 21 and the second magnetic core 22. Preferably but not exclusively, the first connection portion 241 is bent upwardly and the first end surface of the first connection portion 241 is at least partially exposed to the first side 11 to form the power device connection surface 241a of the power conversion module 1. Thereby, the connection of the power device pin SW of the power device in FIG. 3 is achieved. Preferably but not exclusively, the second connection portion 242 is bent downwardly and the second end surface of the second connection portion 242 is at least partially exposed to the second side 12, so as to form the positive output connection surface 242b of the power conversion module 1, which is electrically connected to the positive output pin 442 of the pin layer 40. Thereby, the connection of the positive output terminal Vo+ in FIG. 3 is achieved. Preferably but not exclusively, the first end surface of the third connection portion 243 is at least partially exposed to the first side 11, so as to form the positive input connection surface 243a. The second end surface of the third connection portion 243 is at least partially exposed to the second side 12, so as to form the positive input connection surface 243b, which is electrically connected to the positive input pin 443 of the pin layer 40. Thereby, the connection of the positive input terminal Vin+ in FIG. 3 is achieved. Preferably but not exclusively, in the embodiment, the at least one winding 231a, 231b, the first connection portion 241, the second connection portion 242 and the third connection portion 243 are formed by a prefabricated structure, which is bonded together through a PCB material or a plastic molding material. The prefabricated structure is milled by a milling cutter to form a first recess 14 for receiving the first magnetic core 21, and to form a second recess 15 for receiving the second magnetic core 22. Moreover, at least one hole 16 is milled for the magnetic column 24 to pass through. At the same time, the integrated conductive structure is milled to form the windings 231a, 231b, the first connection portion 241, the second connection portion 242 and the third connection portion 243 of the conductor 23b. In the embodiment, the conductor 23b is exposed to the lateral wall corresponding in position to where the magnetic column 24 passes through. With the conductor 23b exposed to the lateral wall, it facilitates to increase the cross-sectional area of the conductor 23b effectively, and further reduce the DC resistance of the conductor 34b and the loss without increasing the volume of the power conversion module 1.

Similarly, in the embodiment, the third connection portion 243 is used to achieve the connection of the positive input terminal Vin+, and formed by a vertical copper block structure served as the Vin+ conductor. The first end of the third connection portion 243 is connected to the Vin+ network of the power device layer 30, and the second end of the third connection portion 243 is connected to the positive input pin 443 of the pin layer 40. In an embodiment, the magnetic component 20 includes two negative input conductors (not shown) formed by vias and disposed at two sides of the positive input conductor, respectively. The first end of the negative input conductor is connected to the negative input pin 344 of the power device layer 30 on the first circuit board 31. The second end of the negative input conductor is connected to the negative input pin 444 of the pin layer 40. Since the power device layer 30 and the input capacitor layer 50 and the pin layer 40 are separated by the E-shaped output inductance of the magnetic component 20, the distance between the input capacitor layer 50 and the pin layer 40 is long, the loop is large, and the parasitic inductance of the loop is large. The parasitic inductance and the capacitance of the input capacitance layer 50 disposed on the second surface 312 of the first circuit board 31 have a high risk of resonance. In the embodiment, the two negative input conductor are disposed at two sides of the positive input conductor, respectively, so as to reduce the parasitic inductance between the input capacitor Cin and the pin layer 40. Thereby, the risk of resonance between the parasitic inductance and the input capacitor is reduced. In some embodiments, the negative input conductor formed by the vias is replaced by the negative input conductor formed by a vertical copper block. The arrangement of the negative input conductors disposed at both sides of the positive input conductor is also suitable for the design of the output inductance formed by the ring-shaped magnetic core and the vertical winding between the input capacitor layer 50 and the pin layer 40. In other embodiments, the positive input conductors are disposed at both sides of the negative input conductor, and the third connection portion 243 in the foregoing embodiment is replaced by the fourth connection portion 244. The first connection portion 241, the second connection portion 242 and the fourth connection portion 244 are formed by a prefabricated structure, which is bonded together through a PCB material or a plastic molding material. Then, the prefabricated structure is milled by a milling cutter to form the winding and the connection portions of the conductor 23b. Different from the foregoing embodiment, the connection of the negative input terminal Vin− is achieved through the fourth connection portion 244. In the embodiment, the first end of the fourth connection portion 244 is connected to the Vin− network of the power device layer 30, and the second end of the fourth connection portion 244 is connected to the negative input pin 444 of the pin layer 40. In an embodiment, the magnetic component 20 includes two positive input conductors (not shown) formed by vias and disposed at two sides of the negative input conductor, respectively. The first end of the positive input conductor is connected to the positive input pin 343 of the power device layer 30 on the first circuit board 31. The second end of the positive input conductor is connected to the positive input pin 443 of the pin layer 40. With the positive input conductors disposed at the two sides of the negative input conductor, the same effect of reducing the parasitic inductance between the input capacitor layer 50 and the pin layer 40 is achieved.

Please refer to FIG. 1 to FIG. 3 and FIG. 5 to FIG. 7. Notably, in order to increase the power density of the power conversion module 1 of the present disclosure effectively, an E-shaped magnetic core set and a conductor 23 are embedded in a multilayer printed circuit board to form the magnetic component 20. The output terminals of the power devices 30a, 30b are electrically connected to the magnetic component 20 directly. In the embodiment, the magnetic core set formed by the E-shaped first magnetic core 21 and the E-shaped second magnetic core 22 is disposed adjacent to the power devices 30a and 30b, so that the influence of parasitic parameters is reduced effectively. Furthermore, in the closed path of the magnetic field lines, the magnetic cores with a small thickness of the magnetic substrate and a narrow width between the central connection lines of the central column and the side columns are selected to reduce the difference between the inner diameter and the outer diameter of the E-shaped first magnetic core 21 and the E-shaped second magnetic core 22. Preferably but not exclusively, the magnetic core set is embedded in the main body layer 10 by using a vertical arrangement, so as to further improve the power density of the power conversion module 1, and realize the transmission of various signals through the main body layer 10. It makes the assembly and fixation simple and reliable. Moreover, the volume of the power conversion module 1 is reduced, and the overall power density of the power conversion module 1 is improved at the same time.

Figure 9:
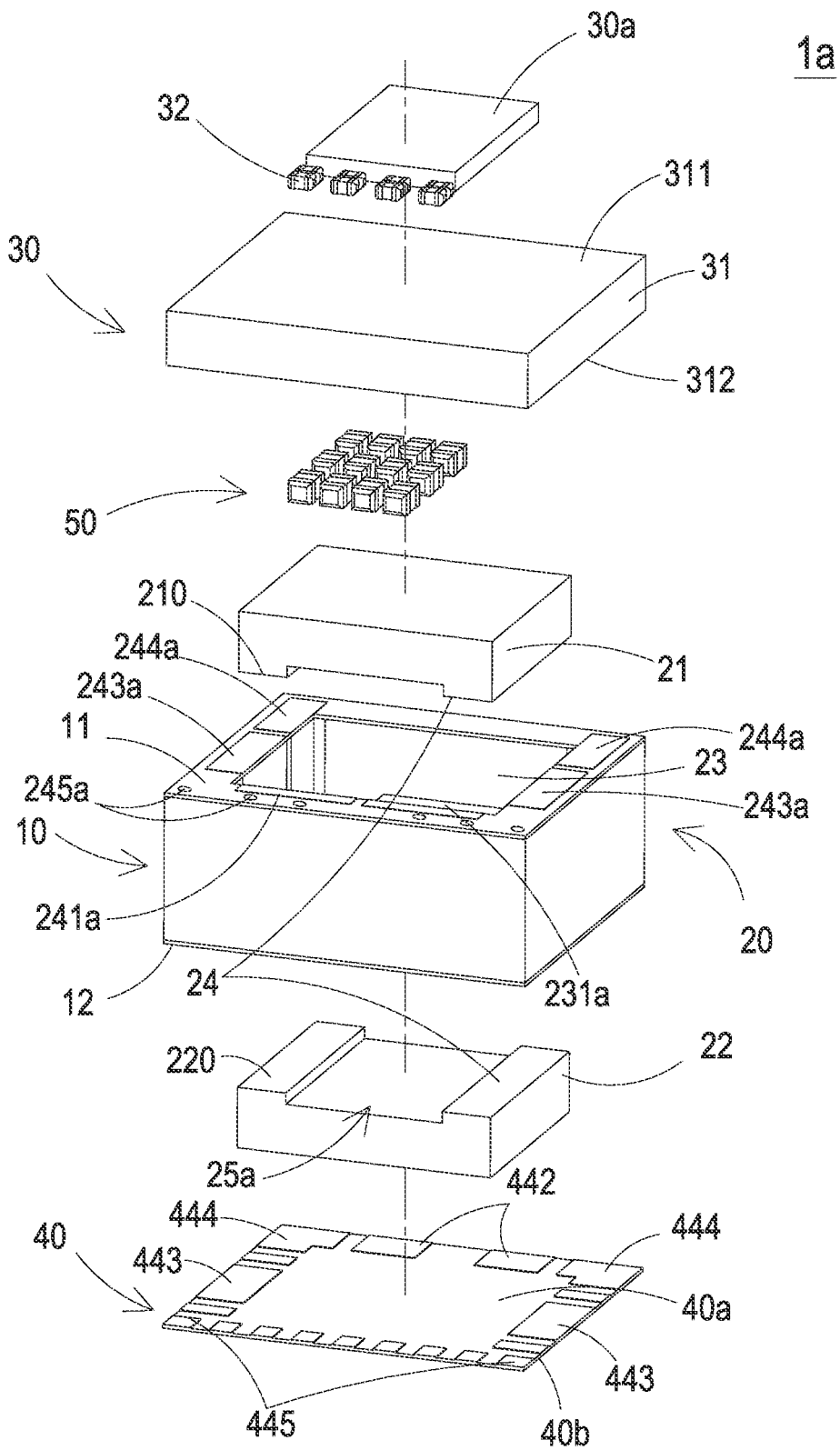
FIG. 9 is an exploded view illustrating a power conversion module according to a second embodiment of the present disclosure.
Figure 10:
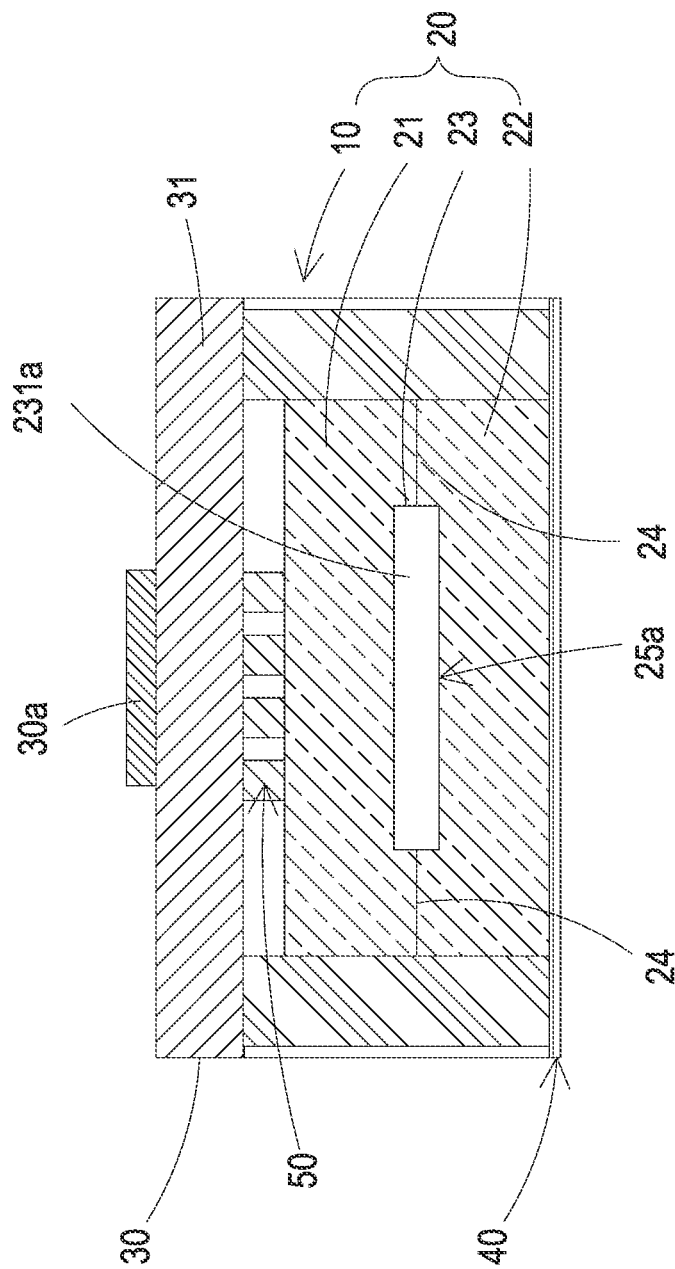
FIG. 10 is a cross-sectional view illustrating the power conversion module according to the second embodiment of the present disclosure.

FIG. 9 is an exploded view illustrating a power conversion module according to a second embodiment of the present disclosure. FIG. 10 is a cross-sectional view illustrating the power conversion module according to the second embodiment of the present disclosure. In the embodiment, the structures, elements and functions of the power conversion module 1a are similar to those of the power conversion module 1 in FIG. 1 to FIG. 3, FIG. 4A and FIG. 4B, and are not redundantly described herein. In the embodiment, the power conversion module 1a includes one power device 30a. Different from the E-shaped first magnetic core 21 and the E-shaped second magnetic core 22 in the first embodiment, in the embodiment, the first magnetic core 21 and the second magnetic core 22 are U-shaped magnetic cores, and the magnetic core set formed by the first magnetic core 21 and the second magnetic core 22 includes the magnetic columns 24 and one window 25a. The window 25a spatially corresponds to the power device 30a. That is, the projection of the power device 30a on a plane with the window 25a passing through is at least partially overlapped with the window 25a. The at least one winding 231a passes through the window 25a to form the required magnetic component 20. In this way, the magnetic core set is embedded in the main body layer 10 in a vertical arrangement, the power density of the power conversion module 1a is improved and the transmission of various signals is achieved through the main body layer 10, so that the assembly and fixation are simple and reliable. Moreover, the volume of the power conversion module 1a is reduced, and the overall power density of the power conversion module 1a is improved at the same time.

Figure 11A:
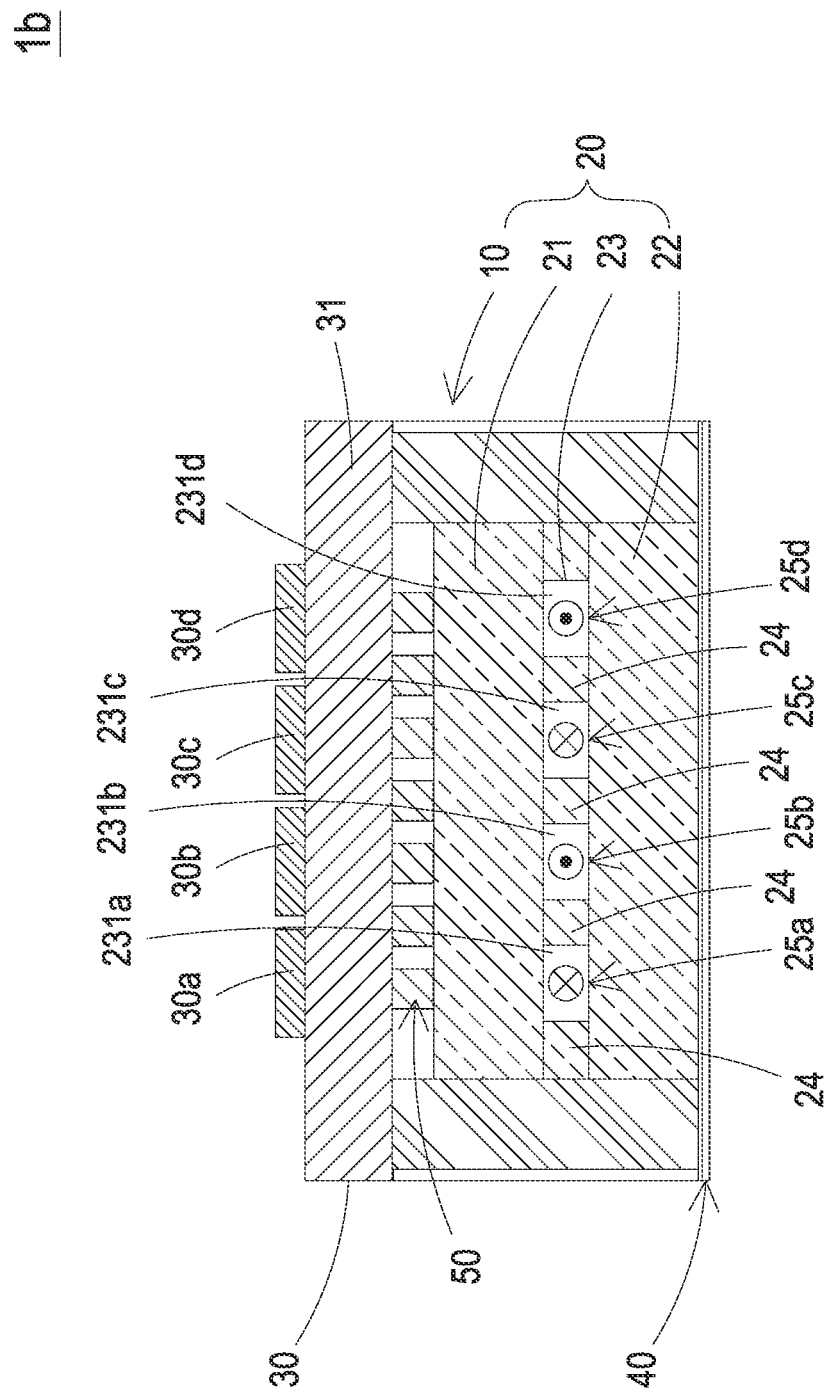
FIG. 11A shows an example of the current direction of the winding of the power conversion module according to a third embodiment of the present disclosure.
Figure 11B:
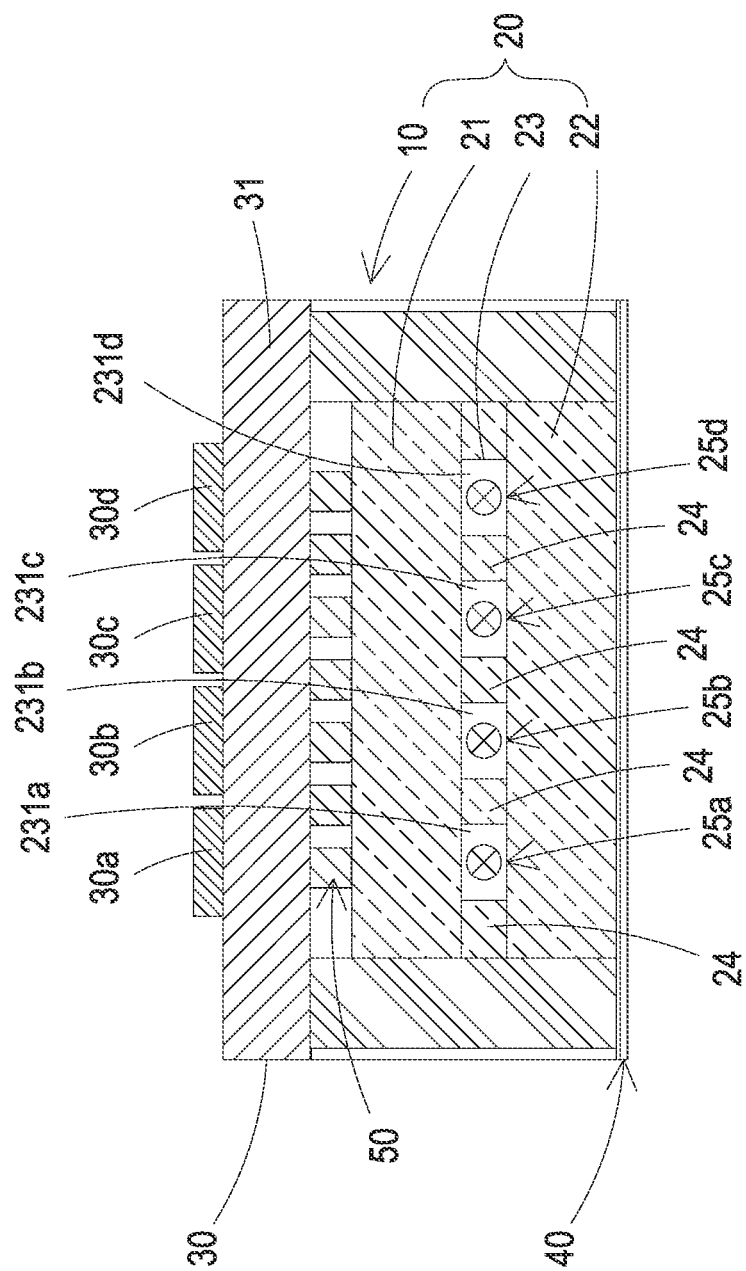
FIG. 11B shows another example of the current direction of the winding of the power conversion module according to the third embodiment of the present disclosure.

FIG. 11A shows an example of the current direction of the winding of the power conversion module according to a third embodiment of the present disclosure. FIG. 11B shows another example of the current direction of the winding of the power conversion module according to the third embodiment of the present disclosure. In the embodiment, the structures, elements and functions of the power conversion module 1b are similar to those of the power conversion module 1a in FIG. 9 and FIG. 10, and are not redundantly described herein. In the embodiment, the first magnetic core 21 and the second magnetic core 22 are I-shaped magnetic cores. The first magnetic core 21 and the second magnetic core 22 are connected through a plurality of magnetic columns 24 to form the magnetic core set, and form four windows 25a, 25b, 25c, 25d. In the embodiment, the four windows 25a, 25b, 25c, 25d spatially correspond to the four power devices 30a, 30b, 30c, 30d of the power conversion module 1a. That is, the projections of the power devices 30a, 30b, 30c, 30d on a plane with the four windows 25a, 25b, 25c, 25d passing through are at least partially overlapped with the window 25a, 25b, 25c, 25d, respectively. In the embodiment, the current directions of the windings 231a, 231b, 231c, 231d in the windows 25a, 25b, 25c, 25d are alternately opposite, as shown in FIG. 11A. In another example, the current directions of the windings 231a, 231b, 231c, 231d in the windows 25a, 25b, 25c, 25d are completely identical, as shown in FIG. 11B. In other words, the four power devices 30a, 30b, 30c, 30d represented as N power devices spatially correspond to the four window 231a, 231b, 231c, 231d represented as N windows, respectively, and the current directions of the windings 231a, 231b, 231c, 231d in the N windows are adjustable according to the practical requirements, to make them completely identical or alternately opposite. In the embodiment, N is an integer and not less than 2. However, the present disclosure is not limited thereto and not redundantly described herein.

Figure 12:
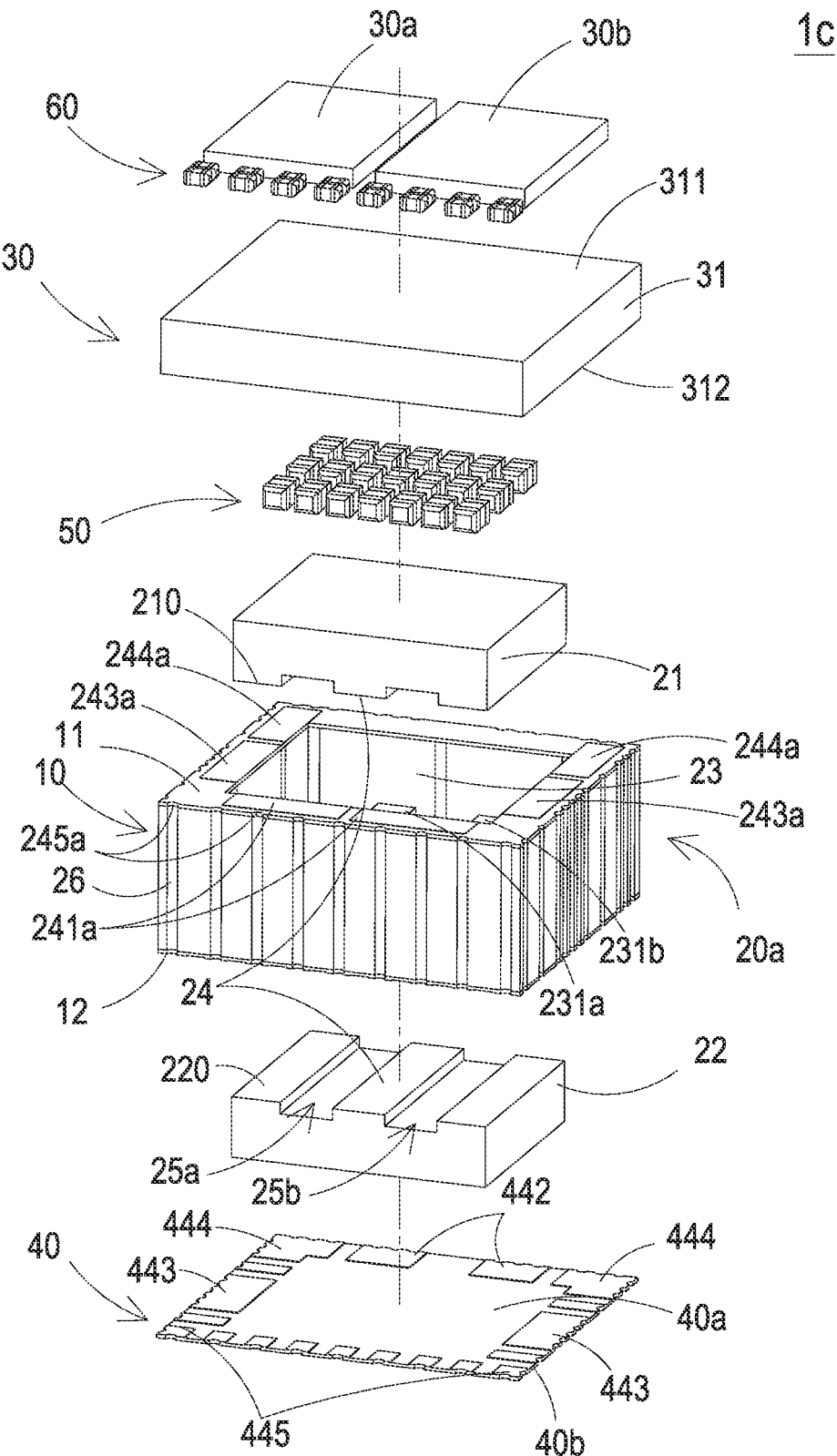
FIG. 12 is an exploded view illustrating a power conversion module according to a fourth embodiment of the present disclosure.
Figure 13:
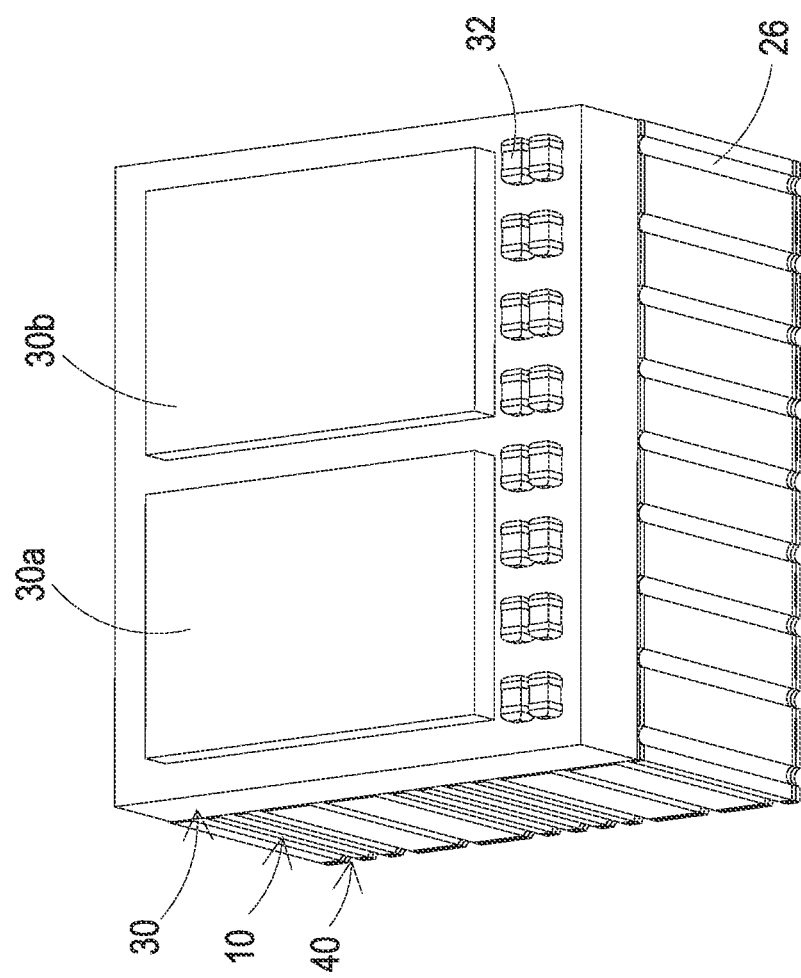
FIG. 13 is a perspective structural view illustrating the power conversion module according to the fourth embodiment of the present disclosure.
Figure 14:
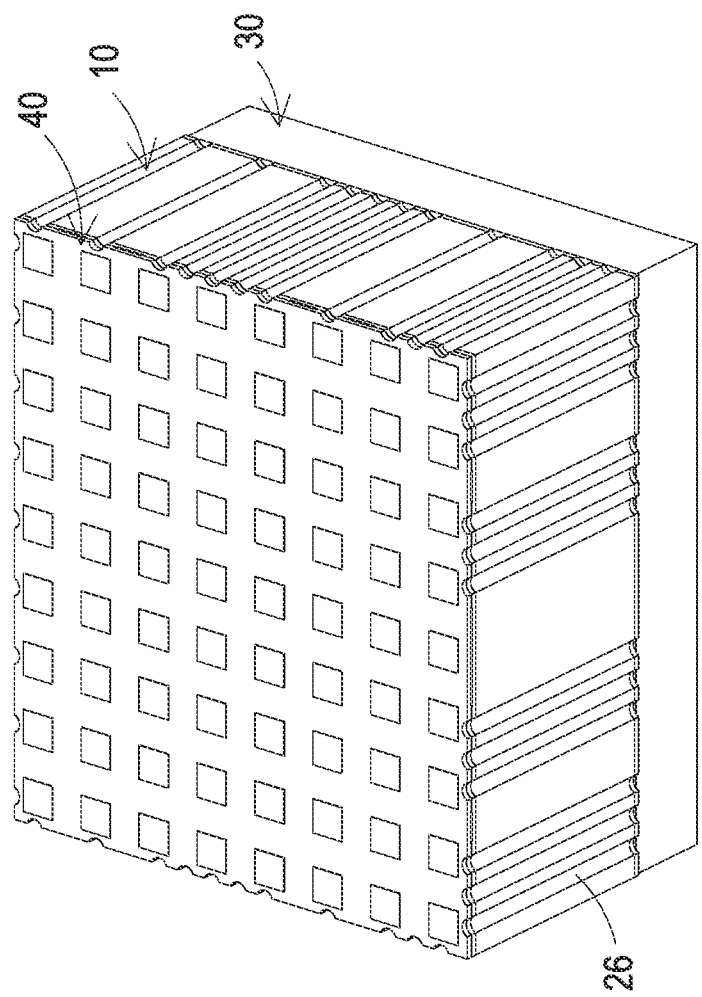
FIG. 14 is a perspective structural view illustrating the power conversion module according to the fourth embodiment of the present disclosure and taken from another perspective.

FIG. 12 is an exploded view illustrating a power conversion module according to a fourth embodiment of the present disclosure. FIGS. 13 and 14 are perspective structural views illustrating the power conversion module according to the fourth embodiment of the present disclosure. In the embodiment, the structures, elements and functions of the power conversion module 1c are similar to those of the power conversion module 1 in FIG. 1 to FIG. 3 and FIG. 4A to FIG. 4B, and are not redundantly described herein. In the embodiment, the power conversion module 1c further includes at least one sidewall electroplating element 26 disposed along the sidewall of the magnetic component 20, and extended from the first side 11 to the second side 12 of the main body layer 10, so that the electrical connection between the power device layer 30 adjacent to the first side 11 and the pin layer 40 adjacent to the second side 12 is achieved through the at least one sidewall electroplating element 26. Preferably but not exclusively, the transmission of various signals is provided. Thus, the power density of the power conversion module 1c is further improved. In other embodiments, the sidewall electroplating element 26 is integrally formed with the windings 231a, 231b, embedded in a circuit board, and then formed by a process such as control-deep milling. Preferably but not exclusively, the sidewall electroplating element 26 is extended from the sidewall of the power device layer 30 through the sidewall of the main body 10 of the magnetic component 20a to the sidewall of the pin layer 40, so that a top circuit and a bottom circuit of the power conversion module 1c are electrically connected through the at least one sidewall electroplating element 26. In an embodiment, a pulse width modulation signal is transmitted through the least one sidewall electroplating element 26, so as to drive the half bridge arms of the power devices 30a, 30b on the first circuit board 31. In another embodiment, a current sensing signal is transmitted through the at least one sidewall electroplating element 26, so as to reflect the current magnitude of the half-bridge arms of the power devices 30a, 30b. The present disclosure is not limited thereto.

Figure 15:
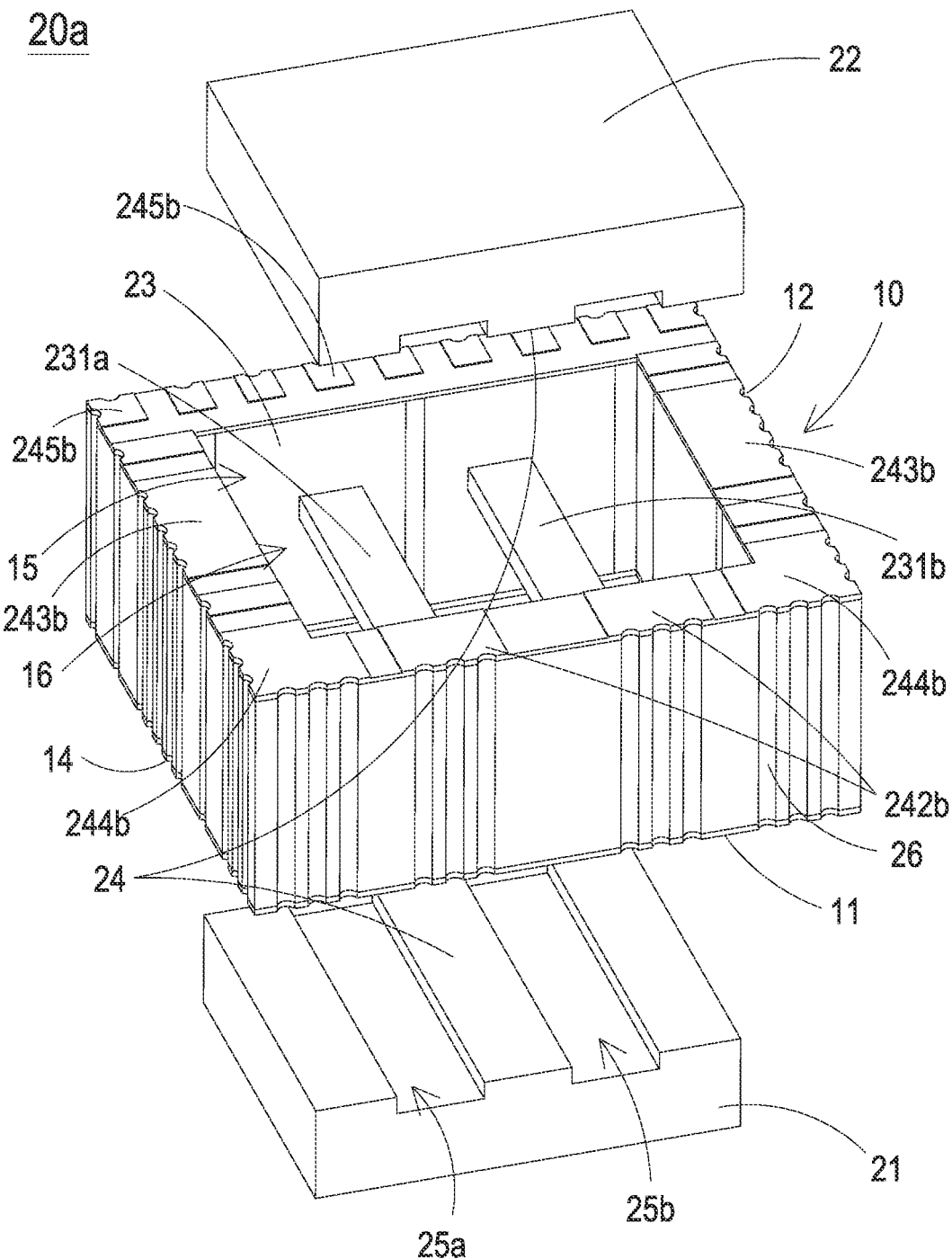
FIG. 15 is an exploded view illustrating the magnetic component according to a second embodiment of the present disclosure.
Figure 16:
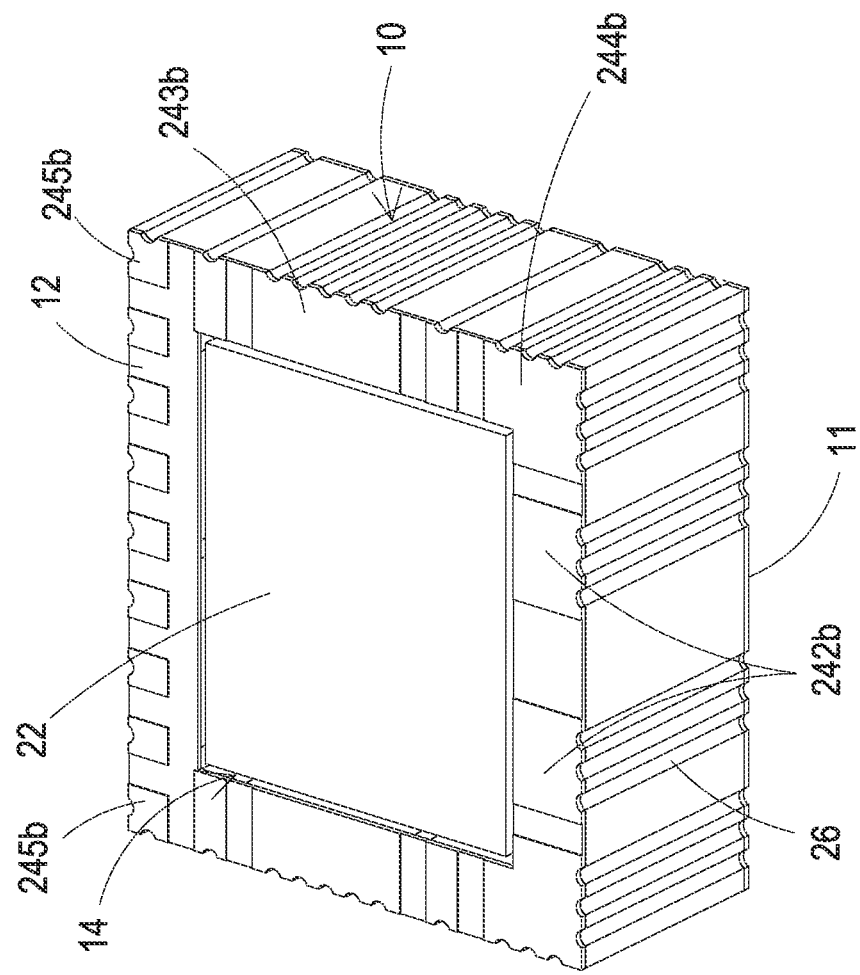
FIG. 16 is a perspective structural view illustrating the magnetic component according to the second embodiment of the present disclosure.
Figure 17:
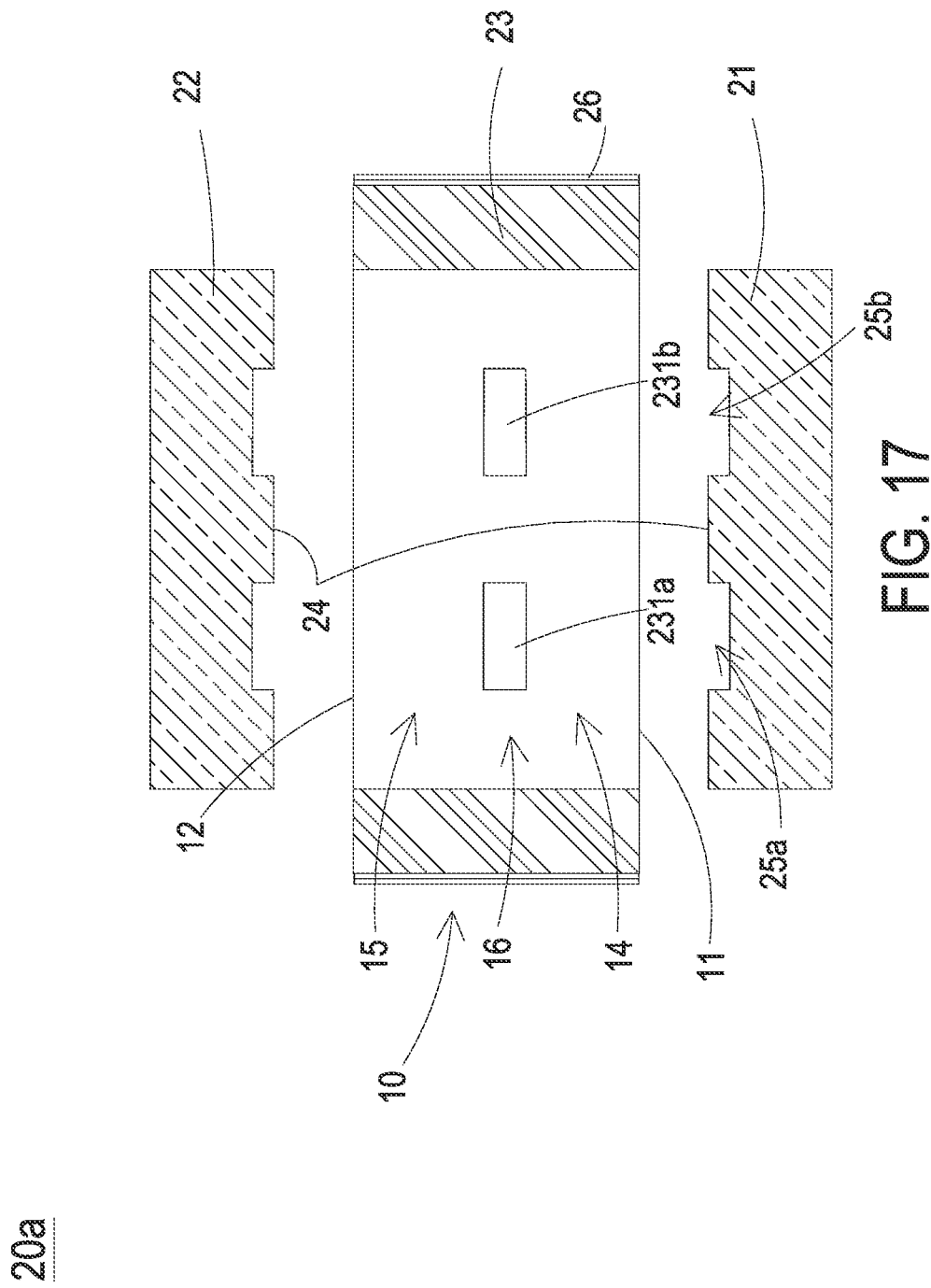
FIG. 17 is a cross-sectional view of FIG. 15.

In addition, the detailed structure of the magnetic component 20a of the power conversion module 1c is further disclosed in FIG. 15 to FIG. 17. FIG. 15 is an exploded view illustrating the magnetic component according to a second embodiment of the present disclosure. FIG. 16 is a perspective structural view illustrating the magnetic component according to the second embodiment of the present disclosure. FIG. 17 is a cross-sectional view of FIG. 15. In the embodiment, the structures, elements and functions of the magnetic component 20a are similar to those of the magnetic component 20 in FIG. 5 to FIG. 7 and are not redundantly described herein. In the embodiment, the magnetic component 20a further comprises at least one sidewall electroplating element 26 extended along the sidewall of the main body layer 10 and disposed between the first side 11 and the second side 12, so that the first side 11 and the second side are electrically connected through the at least one sidewall electroplating element 26. Preferably but not exclusively, the conductor 23 is formed in the main body layer 10 by pre-embedding, and includes at least one winding 231a, 231b, a first connection portion 241, a second connection portion 242, a third connection portion 243 and a fourth connection portion 244 (referring to FIG. 8B). Preferably but not exclusively, the conductor 23 is further connected with the magnetic core set formed by the first magnetic core 21 and the second magnetic core 22 form at least one transformer or inductor. In the embodiment, the first end surface of the first connection portion 241 is at least partially exposed to the first side 11, and the power device connection surface 241a of the power conversion module 1c is formed, so as to achieve the connection of the power device pins SW of the power device shown in FIG. 3. The second end surface of the second connection portion 242 is at least partially exposed to the second side 12, and the positive output connection surface 242b of the power conversion module 1c is formed, so as to achieve the connection of the positive output terminal Vo+ shown in FIG. 3. The first end surface of the third connection portion 243 is at least partially exposed to the first side 11, and the positive input connection surface 243a of the power conversion module 1c is formed. Moreover, the second end surface of the third connection portion 243 is at least partially exposed to the second side 12, and the positive input connection surface 243b is formed and electrically connected to positive the input pin 443 of the pin layer 40, so as to achieve the connection of the positive input terminal Vin+ shown in FIG. 3. In addition, the first end surface of the fourth connection portion 244 is at least partially exposed to the first side 11, and the negative input connection surface 244a of the power conversion module 1c is formed. Moreover, the second end surface of the fourth connection portion 244 is at least partially exposed to the second side 12, and the negative input connection surface 244b is formed and connected to the negative input pin 444 of the pin layer 40. Notably, the at least one winding 231a, 231b, the first connection portion 241, the second connection portion 242, the third connection portion 243 and the fourth connection portion 244 of the conductor 23 are made of for example a copper film or a copper block, so that it is served as the main current connection in the power conversion module 1c. In the embodiment, the sidewall electroplating element 26 is formed by for example half hole with copper plating, so that it is served as the transmission communication of the control signal and the sampled signal in the power conversion module 1c. Certainly, the present disclosure is not limited thereto. Since a large area on the first side 11 and the second side 12 of the main body layer 10 is occupied by the first magnetic core 21 and the second magnetic core 22 of the magnetic component 20a, respectively, in addition to the conductor 23, the transmission communication of various signal between the first side 11 and the second side is achieved through the sidewall electroplating element 26. It is more helpful of increasing the flexibility of circuit design on the power conversion module 1c and reducing the volume of the power conversion module 1c. However, the present disclosure is not limited thereto, and not redundantly described herein.

Figure 18:
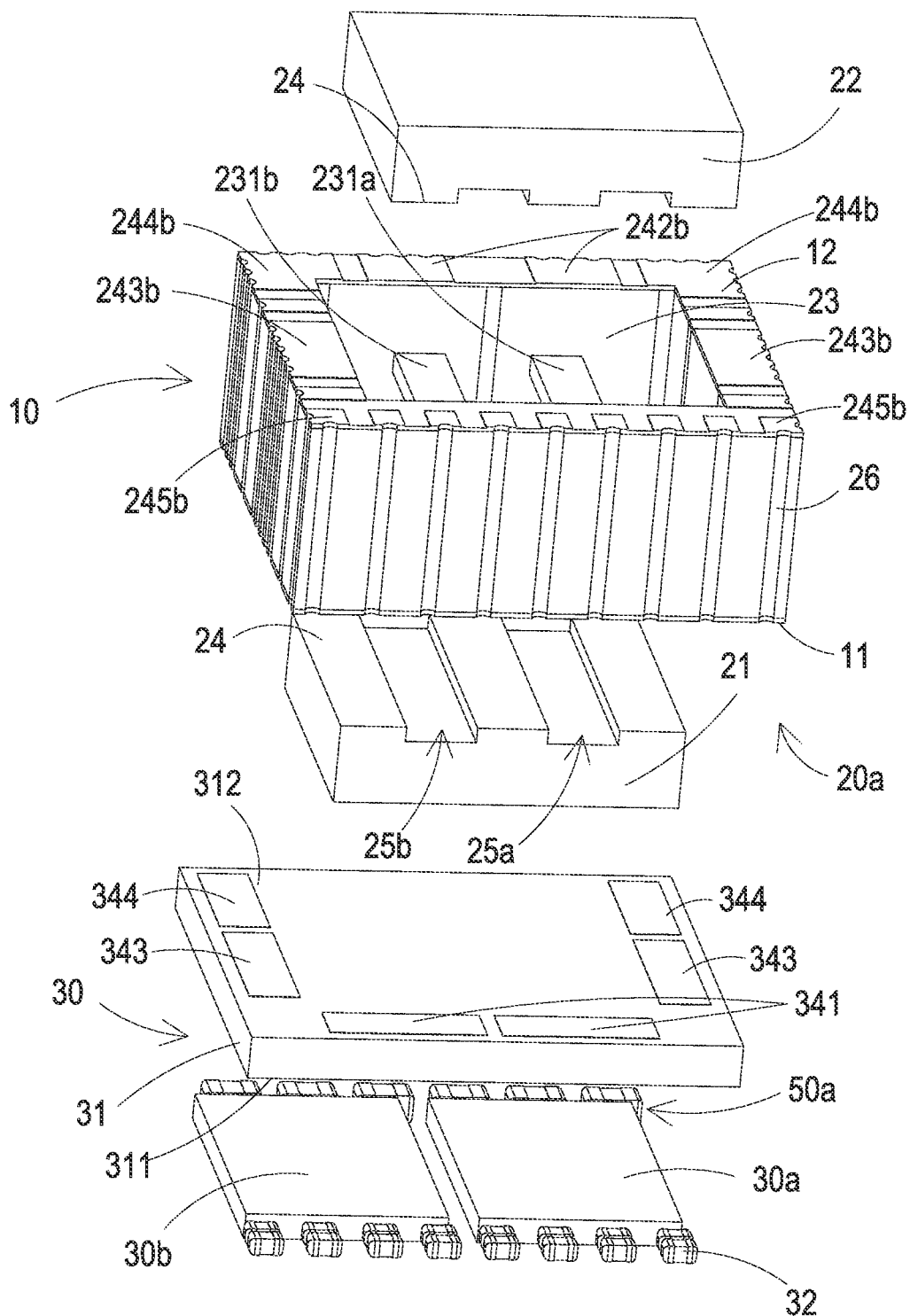
FIG. 18 is an exploded view illustrating a power conversion module according to a fifth embodiment of the present disclosure.
Figure 19:
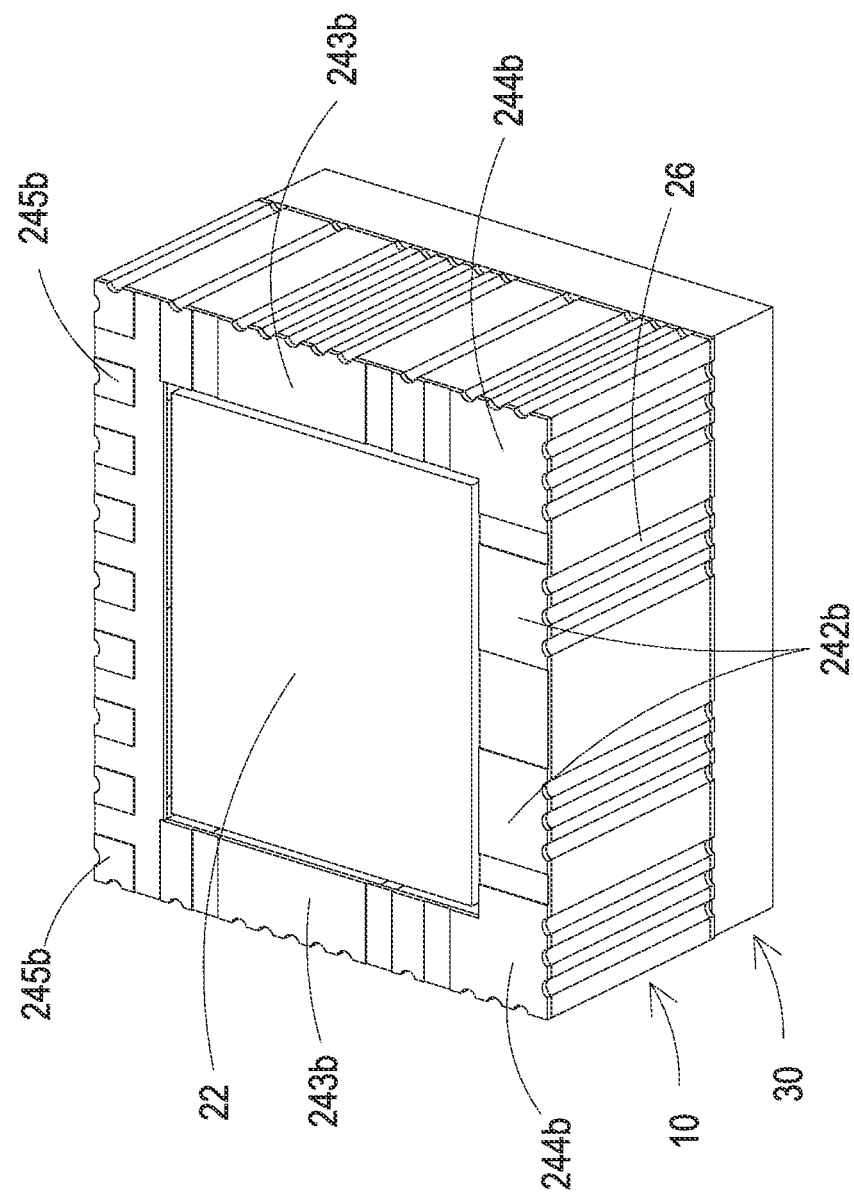
FIG. 19 is a perspective structural view illustrating the power conversion module according to the fifth embodiment of the present disclosure.
Figure 20:
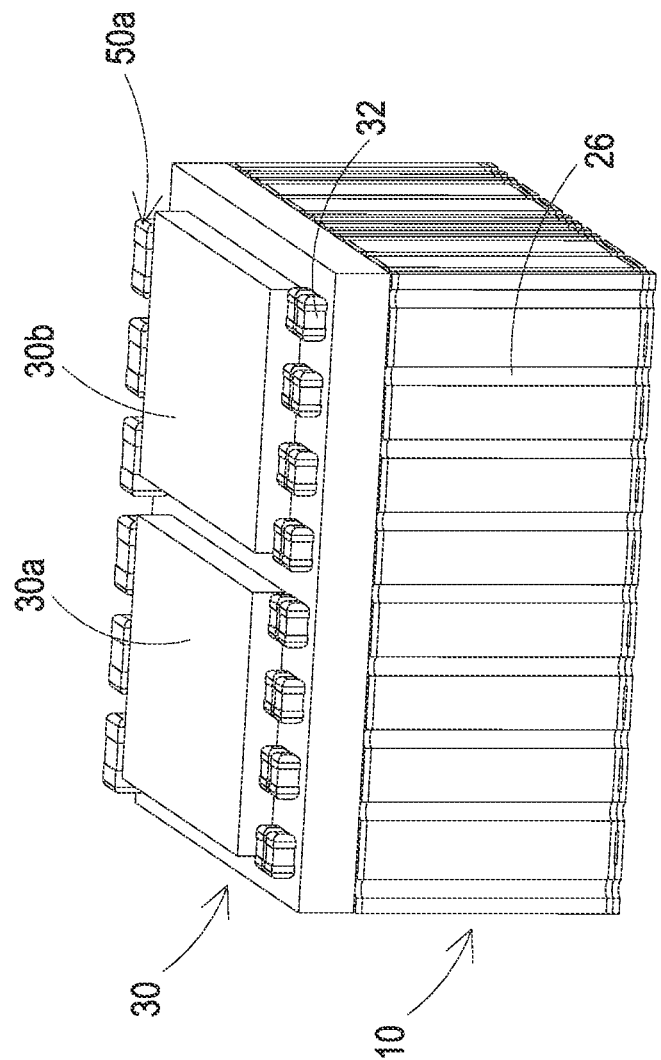
FIG. 20 is a perspective structural view illustrating the power conversion module according to the fifth embodiment of the present disclosure and taken from another perspective.

FIG. 18 is an exploded view illustrating a power conversion module according to a fifth embodiment of the present disclosure. FIGS. 19 and 20 are perspective structural views illustrating the power conversion module according to the fifth embodiment of the present disclosure. In the embodiment, the structures, elements and functions of the power conversion module 1d are similar to those of the power conversion module 1c in FIG. 12 to FIG. 14, and are not redundantly described herein. In the embodiment, the first circuit board 31 of the power device layer 30 is disposed adjacent to the first side 11 of the main body layer 10. The at least one power device 30a, 30b and the control component 32 are disposed on the first surface 311 of the first circuit board 31. Preferably but not exclusively, the pin layer 40 is a connection side formed on the second surface 312 of the main body layer 10, and at least includes a positive output connection surface 242b, a positive input connection surface 243b, a negative input connection surface 244b and a signal control connection surface 245b. Preferable but not exclusively, a coplanar surface is collaboratively formed on the second side 12 by the positive output connection surface 242b, the positive input connection surface 243b, the negative input connection surface 244b, the signal control connection surface 245b and the bottom surface of the second magnetic core 22. In another embodiment, the second magnetic core 22 is lower than the second side 12. Preferably but not exclusively, the positive output connection surface 242b, the positive input connection surface 243b, the negative input connection surface 244b and the signal control connection surface 245b are served as external pins of the power conversion module 1d to be directly electrically connected to the system board. Preferably but not exclusively, in the embodiment, the second end of the signal control connection portion of the power conversion module 1d is disposed on the second side 12 of the main body layer 10 to form a signal control connection surface 245b, which is electrically connected to the first circuit board 31 through the sidewall electroplating element 26. Certainly, the present disclosure is not limited thereto. In the embodiment, the power conversion module 1d further includes a second input capacitor layer 50a. Preferably but not exclusively, the second input capacitor layer 50a is coplanar with the at least one power device 30a, 30b and the control component 32 disposed on the first surface 311 of the first circuit board 31. Thereby, the power device layer 30 and the second input capacitor layer 50a are both formed on the first circuit board 31, and regarded as the same layer structure. The power density of the power conversion module 1d is further increased. Certainly, the present disclosure is not limited thereto.

Figure 21:
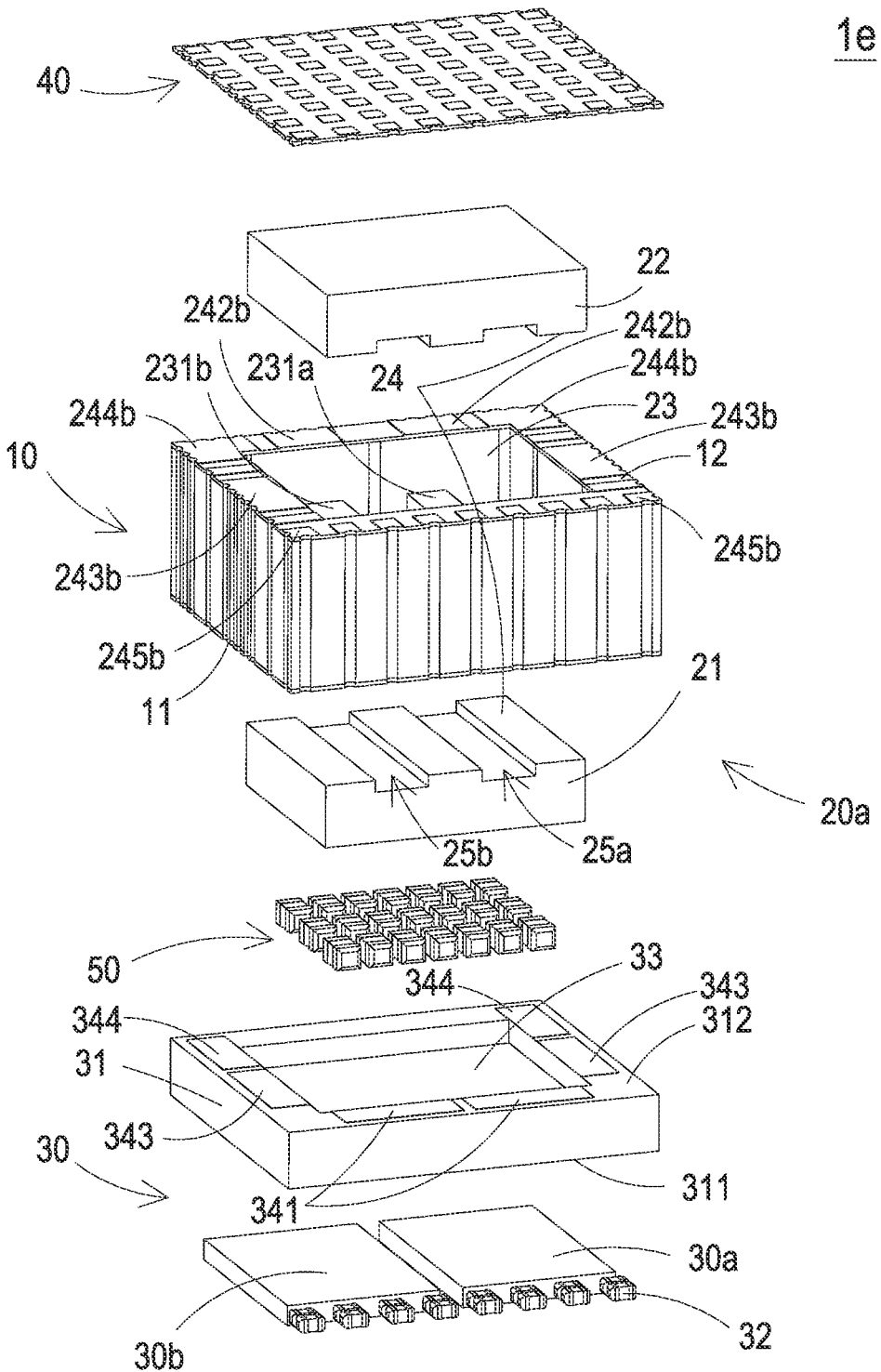
FIG. 21 is an exploded view illustrating a power conversion module according to a sixth embodiment of the present disclosure.
Figure 22:
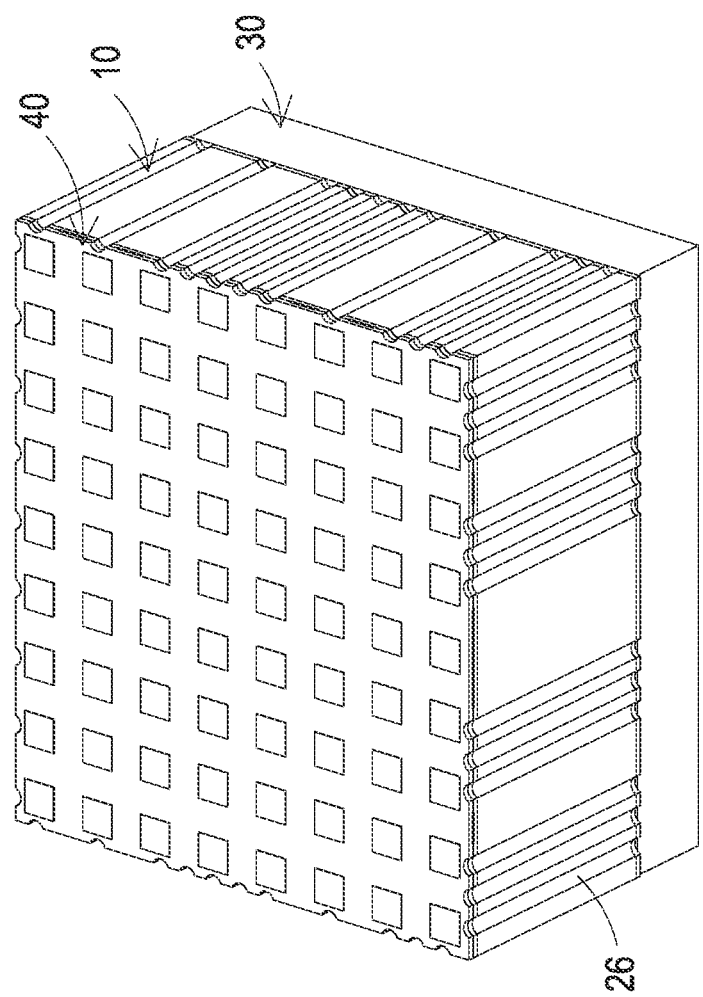
FIG. 22 is a perspective structural view illustrating the power conversion module according to the sixth embodiment of the present disclosure.
Figure 23:
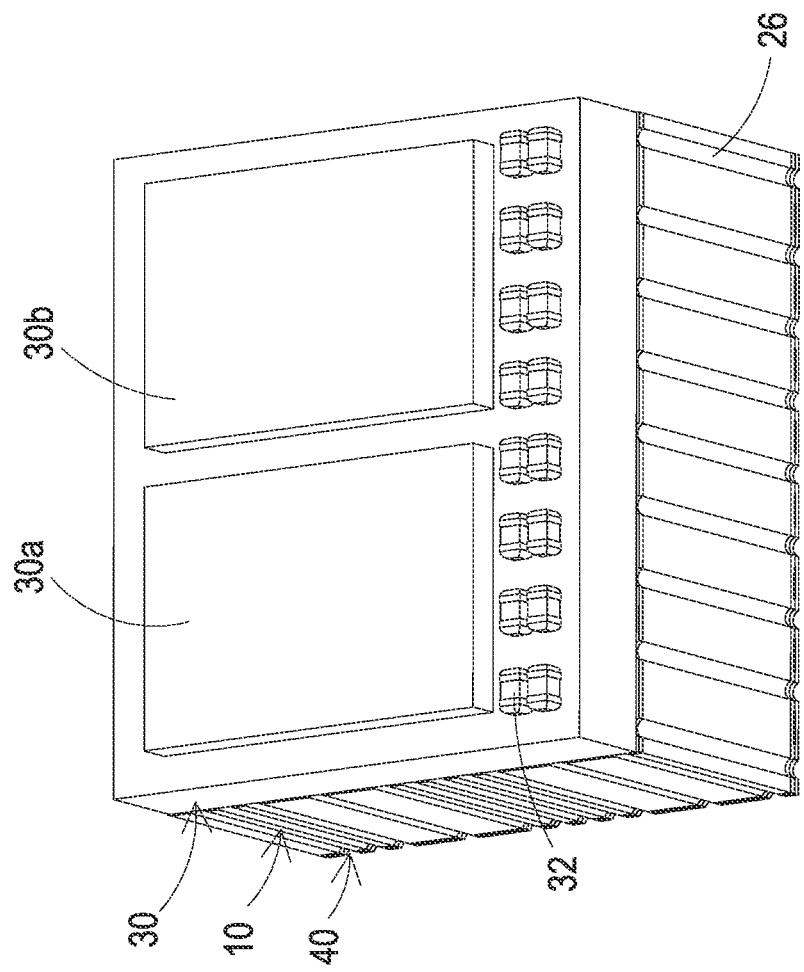
FIG. 23 is a perspective structural view illustrating the power conversion module according to the sixth embodiment of the present disclosure and taken from another perspective.

FIG. 21 is an exploded view illustrating a power conversion module according to a sixth embodiment of the present disclosure. FIGS. 22 and 23 are perspective structural views illustrating the power conversion module according to the sixth embodiment of the present disclosure. In the embodiment, the structures, elements and functions of the power conversion module 1e are similar to those of the power conversion module 1c in FIG. 12 to FIG. 14, and are not redundantly described herein. In the embodiment, the power device layer 30 and the pin layer 40 are disposed on the first side 11 and the second side 12 of the main body layer 10, respectively. Preferably but not exclusively, in the embodiment, the power device layer 30 is a board attached to the first side 22 and comprises the power devices 30a, 30b, the control component 32 and the first circuit board 31. The power devices 30a, 30b and the control component 32 are disposed on the first surface 311 of the first circuit board 31. In the embodiment, the first circuit board 31 further includes an accommodation recess 33. The accommodation recess 33 is recessed inwardly from the second surface 312. The input capacitor layer 50 is at least partially accommodated in the accommodation recess 33, so as to improve the power density of the power conversion module 1e. Certainly, the present disclosure is not limited thereto.

Figure 24:
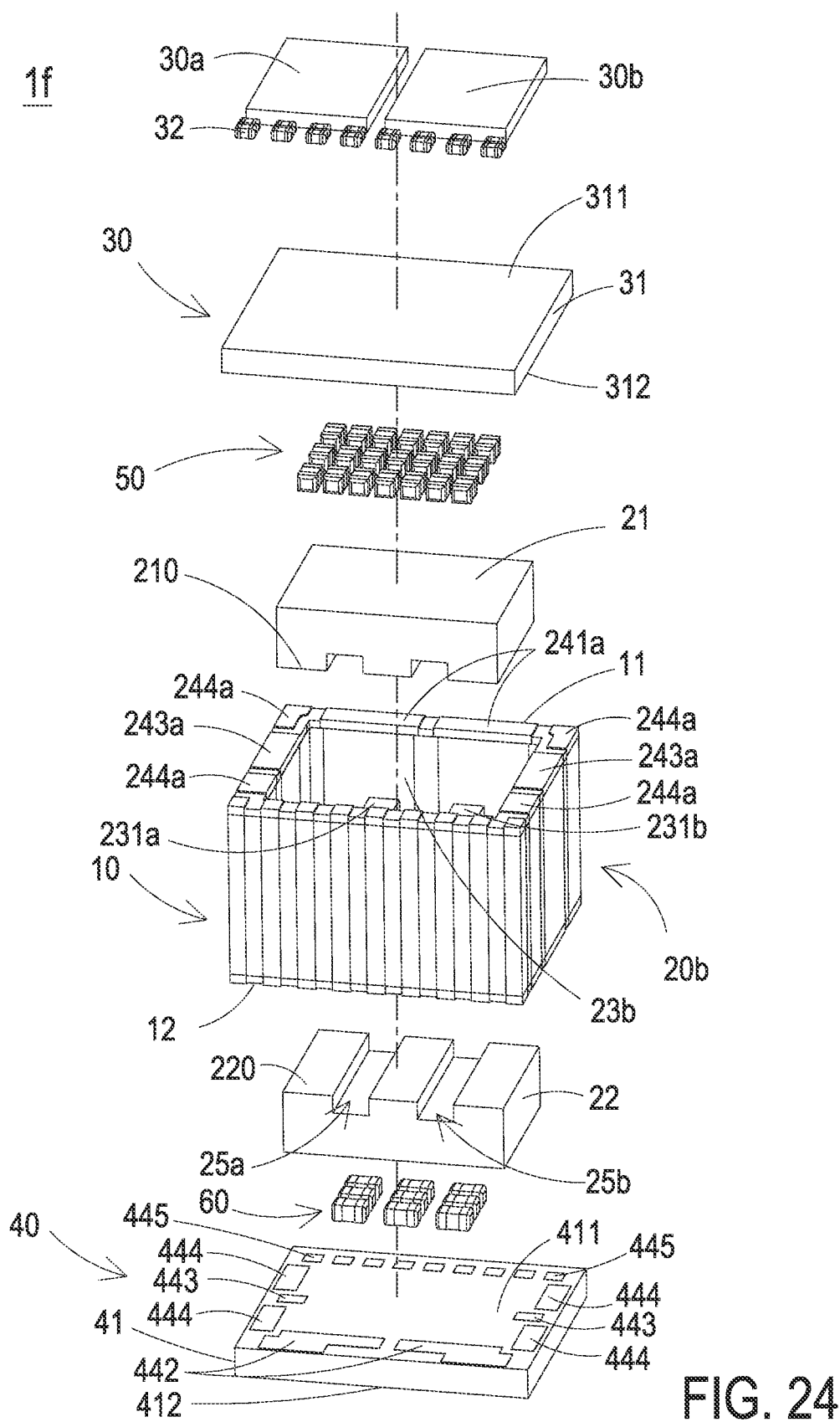
FIG. 24 is an exploded view illustrating a power conversion module according to a seventh embodiment of the present disclosure.
Figure 25:
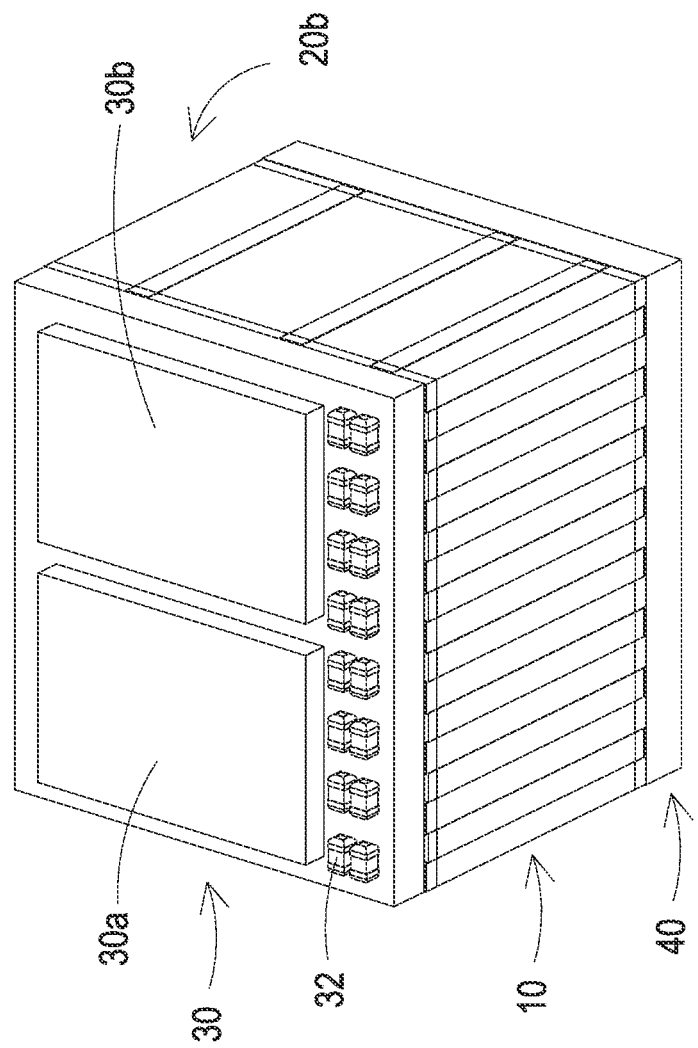
FIG. 25 is a perspective structural view illustrating the power conversion module according to the seventh embodiment of the present disclosure.
Figure 26:
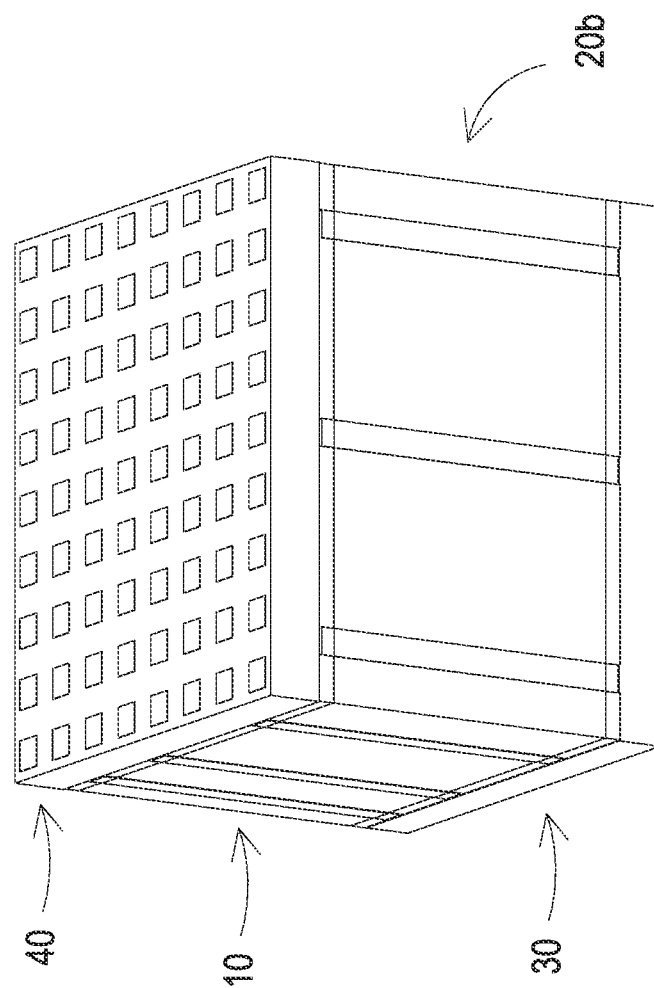
FIG. 26 is a perspective structural view illustrating the power conversion module according to the seventh embodiment of the present disclosure and taken from another perspective.

FIG. 24 is an exploded view illustrating a power conversion module according to a seventh embodiment of the present disclosure. FIGS. 25 and 26 are perspective structural views illustrating the power conversion module according to the seventh embodiment of the present disclosure. In the embodiment, the structures, elements and functions of the power conversion module 1f are similar to those of the power conversion module 1 in FIG. 1 to FIG. 3, FIG. 4A and FIG. 4B, and are not redundantly described herein. In the embodiment, the pin layer 40 is a board, and includes a second circuit board 41, and a positive output pin 442, a positive input pin 443, a negative input pin 444 and a signal control pin 445 disposed on the first surface 411 of the second circuit board 41. The second circuit board 41 includes a first surface 411 and a second surface 412, which are two opposite surfaces. The first surface 411 faces the second side 12 of the main body layer 10. The power conversion module 1f further includes an input capacitor layer 50 and an output capacitor layer 60. In the embodiment, a recess (not shown) is recessed from the second surface 312 of the first circuit board 31 to the first surface 311 of the first circuit board 31, so as to accommodate the input capacitor layer 50. In that, the input capacitor layer 50 is disposed adjacent to the power devices 30a, 30b. When the second magnetic core 22 is embedded in the main body layer 10, the bottom surface of the second magnetic core 22 is recessed from the second side 12 of the main body layer 10, so as to form a recess (not shown). In that, the output capacitor layer 60 is fixed and electrically connected to the first surface 411 of the second circuit board 41 and accommodated in the recess. In other embodiment, an accommodation recess is concavely formed from the first surface 411 of the second circuit board 41 to the second surface 412 of the second circuit board 41, so as to accommodate the output capacitor layer 60. In that, the output capacitor layer 60 is disposed between the second magnetic core 22 and the second circuit board 41.

In the embodiment, the pin layer 40 includes at least two negative input pins 444 disposed at two sides of a positive input pin 443, respectively. In addition, the magnetic component 20b further includes at least two negative input connection surfaces 244a disposed at two sides of a positive input connection surface 243a, respectively, which are formed on the first side 11 of the main body layer 10. Notably, in the embodiment, the structure of the conductor 23b of the magnetic component 20b is similar to that shown in FIG. 8C. In the embodiment, the third connection portion 243 realizes the electrical connection of the positive input pin 443 through a vertical copper block structure. Preferably but not exclusively, in the embodiment, the magnetic component 20b includes two negative input conductors (not shown) for the electrical connections of the negative input pins 444 and the negative input connection surface 244b. In the embodiment, since the input capacitor layer 50 and the pin layer 40 are separated by the magnetic component 20b, it results a longer distance between the input capacitor layer 50 and the pin layer 40, a larger loop and a larger parasitic inductance of the loop. The parasitic inductance and the input capacitor disposed on the second surface 312 of the first circuit board 31 have a high risk of resonance. In the embodiment, with the two negative input conductors disposed at two sides of the positive input conductor, respectively, the parasitic inductance between the input capacitor layer 50 and the pin layer 40 is reduced. Thereby, the risk of resonance between the parasitic inductance and the input capacitor is reduced. In other embodiments, with the positive input conductors disposed at the two sides of the negative input conductor, the same effect of reducing the parasitic inductance between the input capacitor layer 50 and the pin layer 40 is achieved. It is not redundantly described herein.

Figure 27B:
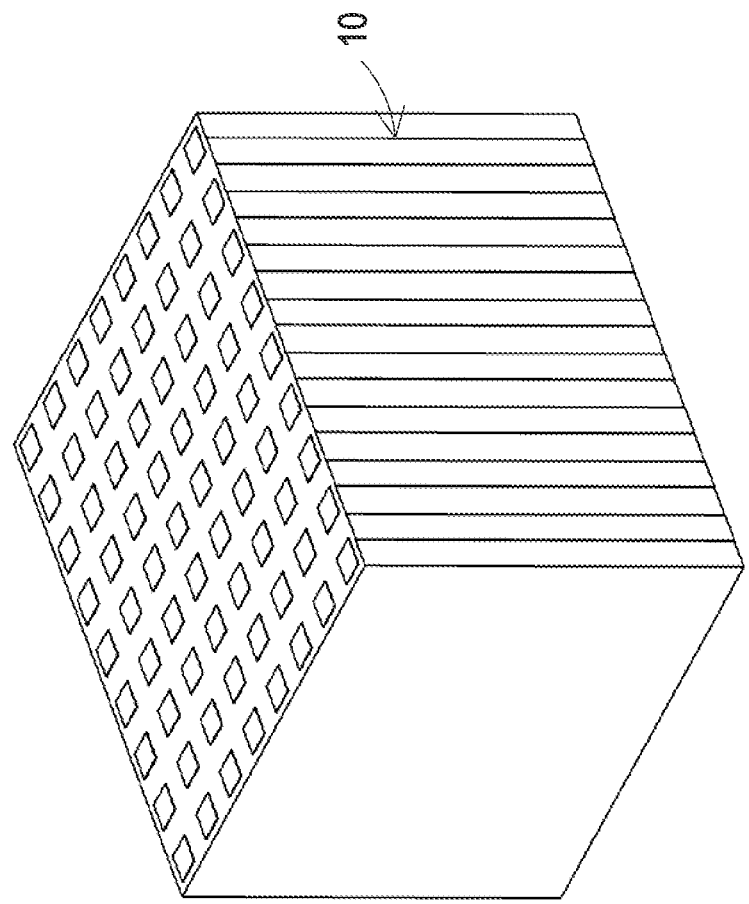

FIGS. 27A and 27B are perspective structural views illustrating a power conversion module 1g according to an eighth embodiment of the present disclosure. In the embodiment, the power device layer 30, the main body layer 10 and the pin layer 40 are combined to form a board. The structural exploded view of the power conversion module 1g is similar to that shown in FIG. 1. As for the technical features and implementation manners shown in FIG. 4A to FIG. 12, FIG. 15 to FIG. 17, FIG. 21 and FIG. 24, and disclosed in the first embodiment, the second embodiment, the third embodiment, the fourth embodiment, the sixth embodiment and the seventh embodiment, the fifth connection portion can be realized through the vias in the board, or realized by electroplating on the sidewall shown in the power conversion module 1g, so that the electrical connection between a top circuit and a bottom circuit of the power conversion module 1g is achieved.

Figure 27C:
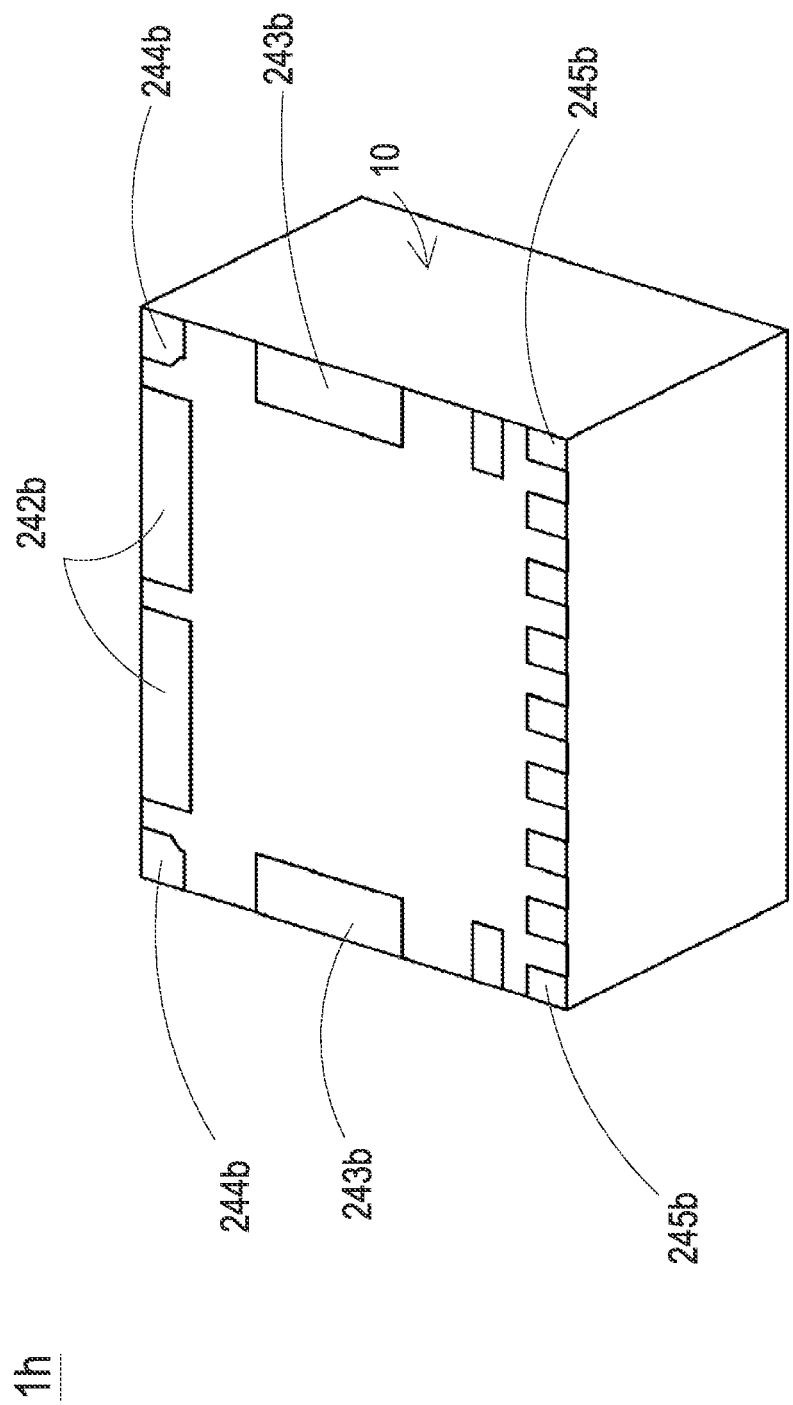
FIG. 27C is a perspective structural view illustrating a power conversion module according to a ninth embodiment of the present disclosure and taken from another perspective.

FIG. 27C is a perspective structural view illustrating a power conversion module according to a ninth embodiment of the present disclosure and taken from another perspective. Please refer to FIG. 27A and FIG. 27C. In the embodiment, the pin layer 40 is omitted in the power conversion module 1h, and the power device layer 30 and the main body layer 10 are combined to form a board. The structural exploded view of the power conversion module 1h is similar to that shown in FIG. 18. Different from the power conversion module 1d in FIG. 18, the entire second magnetic core 22 of the power conversion module 1h is embedded in the board. The external connection surface is formed by the second end surfaces 242b, 243b, 244b, 245b of the second, the third, the fourth and the fifth connection portions. In addition, the features of the power device layer 30 and the main body layer 10 in this embodiment refer to the technical features and implementations of the first embodiment to the seventh embodiment, and the fifth connection portion can be realized through the vias in the board, or realized by electroplating on the sidewall shown in the power conversion module. The present disclosure is not limited thereto.

From the foregoing descriptions, it is known that the power conversion module 1 of the present disclosure is widely adjustable according to the practical requirements. Taking a typical two-phase buck parallel circuit for different applications, the power conversion module 1 of the present disclosure has a circuit variant similar to that shown in FIG. 3. By slightly deforming the structure of the power conversion module and the design of the circuit topology of the present disclosure, the required application is achieved. The present disclosure is not limited thereto.

In summary, the present disclosure provides a power conversion module and a magnetic component thereof. By optimizing the arrangement of various components and disposing the power device on the top of the power conversion module, the top surface of the power device which is the main heat source serves as the highest surface of the power conversion module, so as to facilitate the installation of heat sinks, and force the power conversion module to dissipate heat. By arranging a magnetic core set and a conductor in a main body layer to construct the magnetic component, the output end of the power device is electrically connected to the magnetic component directly, so that the parasitic impedance on the output current transmission path is reduced, and the power density of the power conversion module is improved effectively. Furthermore, when the magnetic core set of the magnetic component is disposed adjacent to the power device, the magnetic core set is embedded in the main body layer by using a vertical arrangement in the closed path of the magnetic field lines, so as to further reduce the parasitic parameters and increase the power density of the power conversion module. Moreover, the transmission of various signals is realized through the main body layer, so as to make the assembly and fixation simple and reliable. At the same time, the volume of the power conversion module is reduced, and the overall power density of the power conversion module is improved. On the other hand, by disposing the magnetic component in the main body layer, it facilitates the pins and the input capacitor of the power conversion module to be optimized according to the practical requirements. For example, the pins and the magnetic component are coplanar, or the input capacitor is disposed adjacent to the power device, so as to optimize the circuit and reduce the influence of parasitic parameters. Furthermore, the purposes of reducing the volume of the power conversion module and increasing the overall power density of the power conversion module are achieved.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power conversion module comprising:
    a magnetic component comprising:
        a main body layer comprising a first side and a second side, wherein the first side and the second side are two opposite sides;
        a first magnetic core embedded in the main body layer and disposed adjacent to the first side;
        a second magnetic core embedded in the main body layer and disposed adjacent to the second side, wherein the first magnetic core and the second magnetic core are disposed correspondingly and connected to each other to form a magnetic core set, which has a plurality of magnetic columns; and
        a conductor embedded between the first side and the second side, and comprising at least one winding, wherein at least one part of the at least one winding is disposed between the plurality of magnetic columns; and
    a power device layer disposed on the first side of the main body layer and comprising at least one power device, wherein the power device is electrically connected to the conductor,
    wherein the conductor comprises a first connection portion and a second connection portion, the first connection portion and the second connection portion are embedded in two opposite walls of the main body layer, respectively, and the at least one winding is connected and stretched between the first connection portion and the second connection portion, wherein one end surface of the first connection portion is at least partially exposed to the first side, so as to form a power device connection surface, and one end surface of the second connection portion is at least partially exposed to the second surface, so as to form a positive output connection surface.

2. The power conversion module according to claim 1, wherein the power device layer comprises a first circuit board electrically connected to the at least one power device, wherein the first circuit board comprises a first surface and a second surface opposite to each other, wherein the at least one power device is disposed on the first surface or the second surface, or embedded between the first surface and the second surface.

3. The power conversion module according to claim 2, wherein the second surface of the first circuit board faces the main body layer, the at least one power device is disposed on the first surface of the first circuit board, and a top surface of the at least one power device is configured to form a coplanar plane of the power conversion module.

4. The power conversion module according to claim 2, further comprising an input capacitor layer, wherein the first circuit board comprises an accommodation recess, the accommodation recess is recessed inwardly from the second surface, and the input capacitor layer is at least partially accommodated in the accommodation recess.

5. The power conversion module according to claim 1, wherein the first magnetic core and the second magnetic core are U-shaped magnetic cores, and the magnetic core set comprises at least one window, wherein the at least one window spatially corresponds to the at least one power device, and the at least one winding passes through the at least one window.

6. The power conversion module according to claim 1, wherein the first magnetic core and the second magnetic core are E-shaped magnetic cores, the at least one power device comprises two power devices, and the magnetic core set comprises two windows, wherein the two windows spatially correspond to the two power devices, respectively, and the at least one winding passes through the two windows, respectively, wherein current directions of the at least one winding in the two windows are the same or opposite.

7. The power conversion module according to claim 1, wherein the first magnetic core and the second magnetic core are I-shaped magnetic cores, the at least one power device comprises N power devices, and the magnetic core set comprises N windows, wherein the N windows spatially correspond to the N power devices, respectively, and the at least one winding passes through the N windows, respectively, wherein N is an integer and not less than 2, and current directions of the at least one winding in the N windows are completely identical or alternately opposite.

8. The power conversion module according to claim 1, wherein the conductor is formed by at least one copper layer or at least one copper block, and is pre-embedded in the main body layer.

9. The power conversion module according to claim 1, wherein a bent structure is collaboratively formed by the at least one winding, the first connection portion and the second connection portion.

10. The power conversion module according to claim 1, further comprising a third connection portion and a fourth connection portion embedded between the first side and the second side of the main body layer, wherein two end surfaces of the third connection portion and two end surfaces of the fourth connection portion are at least partially exposed to the first side and the second side, respectively, so that positive input connection surfaces and negative input connection surfaces are formed on the first side and the second side, respectively.

11. The power conversion module according to claim 10, wherein the positive input connection surface and the negative input connection surface are served as external pins, which are electrically connected to a system board.

12. The power conversion module according to claim 11, further comprising a pin layer disposed on the second side of the main body layer, wherein the pin layer comprises a first surface and a second surface opposite to each other, and a positive input pin, a positive output pin and a negative input pin disposed on the second surface, wherein the positive input pin is electrically connected to the positive input connection surface on the second side, the positive output pin is electrically connected to the positive output connection surface on the second side, and the negative input pin is electrically connected to the negative input connection surface on the second side.

13. The power conversion module according to claim 12, wherein the pin layer further comprises a recess, the recess is recessed from the first surface to the second surface of the pin layer, wherein the power conversion module further comprises an output capacitor layer at least partially accommodated in the recess.

14. The power conversion module according to claim 10, further comprising a fifth connection portion embedded between the first side and the second side of the main body layer, and two end surfaces of the fifth connection surfaces of the fifth connection portion are exposed to the first side and the second side, respectively, so that signal control connection surfaces are formed on the first side and the second side, respectively.

15. The power conversion module according to claim 1, further comprising at least two positive input conductors separately arranged on both sides of a negative input conductor, and/or at least two negative input conductors separately arranged on both sides of a positive input conductor.

16. The power conversion module according to claim 1, wherein the magnetic component further comprises at least one sidewall electroplating element extended along the sidewall of the main body layer, so that the first side and the second side are electrically connected through the at least one sidewall electroplating element.

17. The power conversion module according to claim 1, wherein at least one half bridge arm is formed by the at least one power device.

18. The power conversion module according to claim 1, further comprising an input capacitor layer, wherein the input capacitor layer and the power device layer are located at the same layer, or the input capacitor layer is located between the power device layer and the magnetic component.

* * * * *